(12) United States Patent
Kajiwara et al.

(10) Patent No.: US 9,807,281 B2
(45) Date of Patent: Oct. 31, 2017

(54) IMAGE PROCESSING APPARATUS AND IMAGE PROCESSING METHOD

(71) Applicant: CANON KABUSHIKI KAISHA, Tokyo (JP)

(72) Inventors: Yuto Kajiwara, Kawasaki (JP); Akitoshi Yamada, Yokohama (JP); Okinori Tsuchiya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/223,803

(22) Filed: Jul. 29, 2016

(65) Prior Publication Data

US 2017/0041508 A1 Feb. 9, 2017

(30) Foreign Application Priority Data

Aug. 7, 2015 (JP) ................. 2015-156850

(51) Int. Cl.
 *H04N 1/60* (2006.01)
 *G06K 15/02* (2006.01)
 *H04N 1/00* (2006.01)
 *H04N 1/52* (2006.01)

(52) U.S. Cl.
 CPC .......... *H04N 1/6027* (2013.01); *G06K 15/02* (2013.01); *G06K 15/1872* (2013.01); *H04N 1/00408* (2013.01); *H04N 1/52* (2013.01)

(58) Field of Classification Search
 CPC .... H04N 1/6027; H04N 1/00408; H04N 1/52; G06K 15/02; G06K 15/1872
 See application file for complete search history.

(56) References Cited

U.S. PATENT DOCUMENTS

| 5,111,310 | A  | 5/1992 | Parker |
| 6,867,884 | B1 | 3/2005 | Rozzi |
| 7,099,046 | B2 | 8/2006 | Yamada |
| 7,312,901 | B2 | 12/2007 | Yamada |
| 7,548,346 | B2 | 6/2009 | Yamada |
| 7,672,011 | B2 | 3/2010 | Kato |
| 7,855,809 | B2 | 12/2010 | Kato |
| 7,859,723 | B2 | 12/2010 | Yamada |
| 7,965,418 | B2 | 6/2011 | Yamada |

(Continued)

OTHER PUBLICATIONS

U.S. Appl. No. 15/040,449, filed Feb. 10, 2016.
U.S. Appl. No. 15/014,935, filed Feb. 3, 2016.

*Primary Examiner* — Christopher D Wait
(74) *Attorney, Agent, or Firm* — Fitzpatrick, Cella, Harper & Scinto

(57) ABSTRACT

An image processing apparatus sets a threshold value matrix for each of multiple color materials, and uses the set threshold value matrix to acquire a first threshold value. On the other hand, the image processing apparatus sets reference data on the basis of multivalued data of that color material. Then, the image processing apparatus calculates a second threshold value matrix by performing a predetermined process on the first threshold value on the basis of the reference data for that color material. Further, by comparing the second threshold value with the multivalued data, quantization data for printing a dot is generated. When doing this, the threshold value matrix and the reference data for that color material are set so as to make the graininess of a dot pattern of that color material lower than the graininess of a mixed color dot pattern obtained by mixing dot patterns of the respective multiple color materials.

15 Claims, 22 Drawing Sheets

(56) References Cited

U.S. PATENT DOCUMENTS

| | | |
|---|---|---|
| 8,503,031 B2 | 8/2013 | Kajihara |
| 8,619,319 B2 | 12/2013 | Tsuchiya |
| 8,830,530 B2 | 9/2014 | Sano |
| 9,087,291 B2 | 7/2015 | Hori |
| 9,092,720 B2 | 7/2015 | Nakagawa |
| 9,210,292 B2 | 12/2015 | Miyake |
| 2011/0116115 A1 | 5/2011 | Kawatoko | fg

FIG. 22

FIRST THRESHOLD VALUE MATRIX

| 3219 | 7 | 649 | 2324 | 1431 | 230 | 1143 | 3913 | 866 | 3154 |
|---|---|---|---|---|---|---|---|---|---|
| 2398 | 1744 | 1209 | 2777 | 2025 | 3729 | 1682 | 2666 | 1497 | 1945 |
| 1503 | 3918 | 3005 | 3550 | 789 | 3214 | 525 | 3048 | 346 | 3490 |
| 1066 | 492 | 2526 | 157 | 1880 | 1043 | 2238 | 2465 | 3762 | 1012 |
| 815 | 3341 | 2182 | 1322 | 4017 | 3395 | 1387 | 43 | 2061 | 1757 |
| 1973 | 3782 | 1661 | 366 | 2677 | 657 | 3821 | 2821 | 812 | 2631 |
| 1166 | 2770 | 3135 | 962 | 2389 | 1783 | 2981 | 1582 | 3575 | 3127 |
| 635 | 67 | 1466 | 3609 | 3279 | 188 | 1087 | 450 | 1240 | 2165 |
| 1736 | 3887 | 2288 | 510 | 2082 | 3941 | 1929 | 2547 | 3327 | 120 |
| 2046 | 2573 | 890 | 2895 | 1303 | 741 | 3081 | 3666 | 2336 | 1670 |

SECOND THRESHOLD VALUE MATRIX

| 2504 | 1738 | 3814 | 303 | 2331 | 3916 | 2870 | 3677 | 1470 | 2659 |
|---|---|---|---|---|---|---|---|---|---|
| 3585 | 500 | 2175 | 876 | 3120 | 688 | 441 | 2487 | 8 | 1055 |
| 43 | 1189 | 3378 | 2739 | 1597 | 1973 | 1153 | 3355 | 1786 | 3076 |
| 1958 | 3012 | 1375 | 4035 | 150 | 3705 | 2958 | 2252 | 3956 | 706 |
| 830 | 2320 | 635 | 1820 | 2520 | 967 | 1342 | 268 | 1524 | 2766 |
| 3627 | 2649 | 3444 | 412 | 3221 | 2078 | 3526 | 585 | 2465 | 3767 |
| 3974 | 180 | 1135 | 1494 | 3831 | 773 | 2693 | 3158 | 1903 | 1097 |
| 2191 | 3100 | 2007 | 2852 | 2354 | 63 | 1679 | 4089 | 396 | 3449 |
| 1318 | 1712 | 667 | 3562 | 1020 | 3046 | 1229 | 2196 | 1456 | 809 |
| 3786 | 2577 | 295 | 3944 | 1862 | 516 | 3736 | 2567 | 201 | 3321 |

# IMAGE PROCESSING APPARATUS AND IMAGE PROCESSING METHOD

BACKGROUND OF THE INVENTION

Field of the Invention

The present invention relates to an image processing apparatus and image processing method for performing a quantization process to form an image on a print medium.

Description of the Related Art

When using a pseudo gradation method to print an image, it is necessary to quantize multi-valued image data, and as a quantization method used for the quantization, an error diffusion method and a dither method are known. In particular, the dither method that compares a preliminarily stored threshold value and a gradation value of multi-valued data with each other to determine dot printing or non-printing has a small processing load as compared with the error diffusion method, and is therefore widely used in many image processing apparatuses. In the case of such a dither method, in particular, dot dispersibility in a low gradation range becomes problematic; however, for example, U.S. Pat. No. 5,111,310 proposes a method adapted to use a threshold value matrix having blue noise characteristics as a threshold value matrix for obtaining preferable dot dispersibility.

FIGS. 18A to 18C are diagrams for explaining a dither process using a threshold value matrix having blue noise characteristics. FIG. 18A illustrates an example of image data to be inputted into a 10-pixel×10-pixel area. This example shows a state where a gradation value of "36" is inputted to all the pixels. FIG. 18B illustrates a threshold value matrix prepared corresponding to the above 10-pixel× 10-pixel area. Each of the pixels is related to any of threshold values of 0 to 254. In the dither method, when a gradation value indicated by multivalued image data is larger than a threshold value, a corresponding pixel is designated as dot printing "1". On the other hand, when a gradation value indicated by multivalued image data is equal to or less than a threshold value, a corresponding pixel is designated as dot non-printing "0". FIG. 18C illustrates a quantization result based on the dither method. Pixels representing printing "1" are indicated in gray, and pixels representing non-printing "0" are indicated in white. The distribution of printing "1" pixels as seen in FIG. 18C depends on threshold value arrangement in a threshold value matrix. By using the threshold value matrix having blue noise characteristics as in FIG. 18B, even in the case where the same pieces of multivalued data are inputted into the predetermined area as in FIG. 18A, the printing "1" pixels are arranged in a high dispersibility state as in FIG. 18C.

FIGS. 19A and 19B are diagrams illustrating blue noise characteristics and human visual characteristics or a human transfer function (VTF) at a visibility distance of 300 mm. In both of the diagrams, the horizontal axis represents a frequency (cycles/mm), indicating lower and higher frequencies toward the left and right of the graph, respectively. On the other hand, the vertical axis represents intensity (power) corresponding to each frequency.

Referring to FIG. 19A, the blue noise characteristics are characterized by, for example, a suppressed low frequency component, a rapid rise, and a flat high frequency component. A frequency fg corresponding to a peak resulting from the rapid rise is referred to as a principal frequency. On the other hand, for the human visual characteristics (VTF) illustrated in FIG. 19B, as an example, the following Dooley approximate expression is used. In the expression, 1 represents an observation distance and f represents a frequency.

$$VTF = 5.05 \times \exp(-0.138 \times \pi l f/180) \times (1 - \exp(0.1 \times \pi l f/180)) \quad \text{Expression 1}$$

As can be seen from FIG. 19B, the human visual characteristics have high sensitivity in a lower frequency range, but sensitivity in a higher frequency range is low. That is, a lower frequency component is conspicuous, whereas a higher frequency component is inconspicuous. The blue noise characteristics are based on such visual characteristics, and adapted to, in the visual characteristics, hardly have power in the highly sensitive (conspicuous) lower frequency range, but have power in the low sensitive (inconspicuous) higher frequency range. For this reason, when a person visually observes an image subjected to a quantization process using a threshold value matrix having blue noise characteristics, dot deviation or periodicity is unlikely to be perceived, and the image is recognized as a comfortable image.

On the other hand, U.S. Pat. No. 6,867,884 discloses a dither method for solving a situation where even though preferable dispersibility can be obtained on a color material basis (i.e., on a color basis), when printing an image using multiple color materials (i.e., mixed color), dispersibility is deteriorated to make graininess conspicuous. Specifically, U.S. Pat. No. 6,867,884 discloses a method that prepares one common dither matrix having preferable dispersibility as in FIG. 18B, and performs a quantization process while shifting mutual threshold values among multiple colors. The quantization method disclosed in U.S. Pat. No. 6,867,884 is herein referred to a color correlating process. The color correlating process makes it possible to achieve preferable image quality even in a mixed color image because dots having different colors are mutually exclusively printed in a highly dispersive state in a low gradation range.

However, the above-described color correlating process can make graininess inconspicuous in a dot pattern in which ink dots of multiple colors are mixed, but may make the dispersibility of dots of a specific ink rather conspicuous. U.S. Pat. No. 6,867,884 gives priority to enhancing the dispersibility of a black ink having the strongest dot power among multiple color inks, and sets black for a channel for which a threshold value is set without offsetting among multiple channels using the common threshold value matrix. However, for example, when expressing a full color image using cyan, magenta, and yellow without using black, if a channel for the lowest threshold value range is set for one of cyan and magenta having equivalent dot power, the graininess of the other one may become conspicuous. A specific description will be given below.

FIG. 20 is a diagram illustrating a dot print state obtained when performing the color correlating process with inks of three colors assigned to first to third channels. While using the same threshold value matrix having blue noise characteristics, a threshold value is set for data of the first color assigned to the first channel without offsetting, and a threshold value offset on the basis of the data of the first color is set for data of the second color. Further, for data of the third color, a threshold value offset on the basis of the pieces of data of the first and second colors is set. For this reason, in a dot pattern 1910 of the first color, and in the sum 1940 of dot patterns of the first to third colors, dots are preferably dispersed and graininess is also suppressed. On the other hand, in each of the dot pattern 1920 of the second color and the dot pattern 1930 of the third color, both dispersibility and graininess are deteriorated.

FIGS. 21A to 21C are diagrams quantitatively illustrating the graininesses of the dot patterns illustrated in FIG. 20. In FIG. 21A, the horizontal axis represents a spatial frequency, and the vertical axis represents average intensity (power) corresponding to the spatial frequency. It turns out that each of the dot patterns of the first color and the mixed color has sufficiently suppressed power in a lower frequency range and also has a power peak positioned near a principal frequency fg. That is, each of the dot patterns of the first color and the mixed color has blue noise characteristics. On the other hand, each of the dot patterns of the second and third colors has a certain level of power in the lower frequency range, does not have a steep peak, and has power already reduced near the principal frequency fg. That is, each of the dot patterns of the second and third colors does not have blue noise characteristics.

FIG. 21B is a diagram illustrating, as response values, results of multiplying the frequency characteristics illustrated in FIG. 21A by the human visual characteristics (VTF) illustrated in FIG. 18B. Also, FIG. 21C illustrates integrated values of the response values in FIG. 21B. A larger response value or a larger response integrated value means that the graininess of a dot pattern is more easily visually perceived. In this example, the response or integrated values of the second and third color dot patterns are larger than those of the first and mixed color dot patterns, and therefore the graininesses of the second and third color dot patterns are easily perceived. That is, even when employing the method disclosed in U.S. Pat. No. 6,867,884 to suppress graininess in a mixed color image, the graininess of a dot pattern of a specific ink color may be conspicuous in the mixed color image to deteriorate image quality.

SUMMARY OF THE INVENTION

The present invention is made in order to solve the above-described problem. Accordingly, an object of the present invention is to provide an image processing apparatus and image processing method that when printing a color image using multiple color materials in accordance with a pseudo gradation method, can keep graininess lower than before over the whole of the image.

Further features of the present invention will become apparent from the following description of exemplary embodiments (with reference to the attached drawings).

BRIEF DESCRIPTION OF THE DRAWINGS

FIG. 22 is a diagram illustrating an example of first and second threshold value matrices.

DESCRIPTION OF THE EMBODIMENTS

First Embodiment

Figure 1:
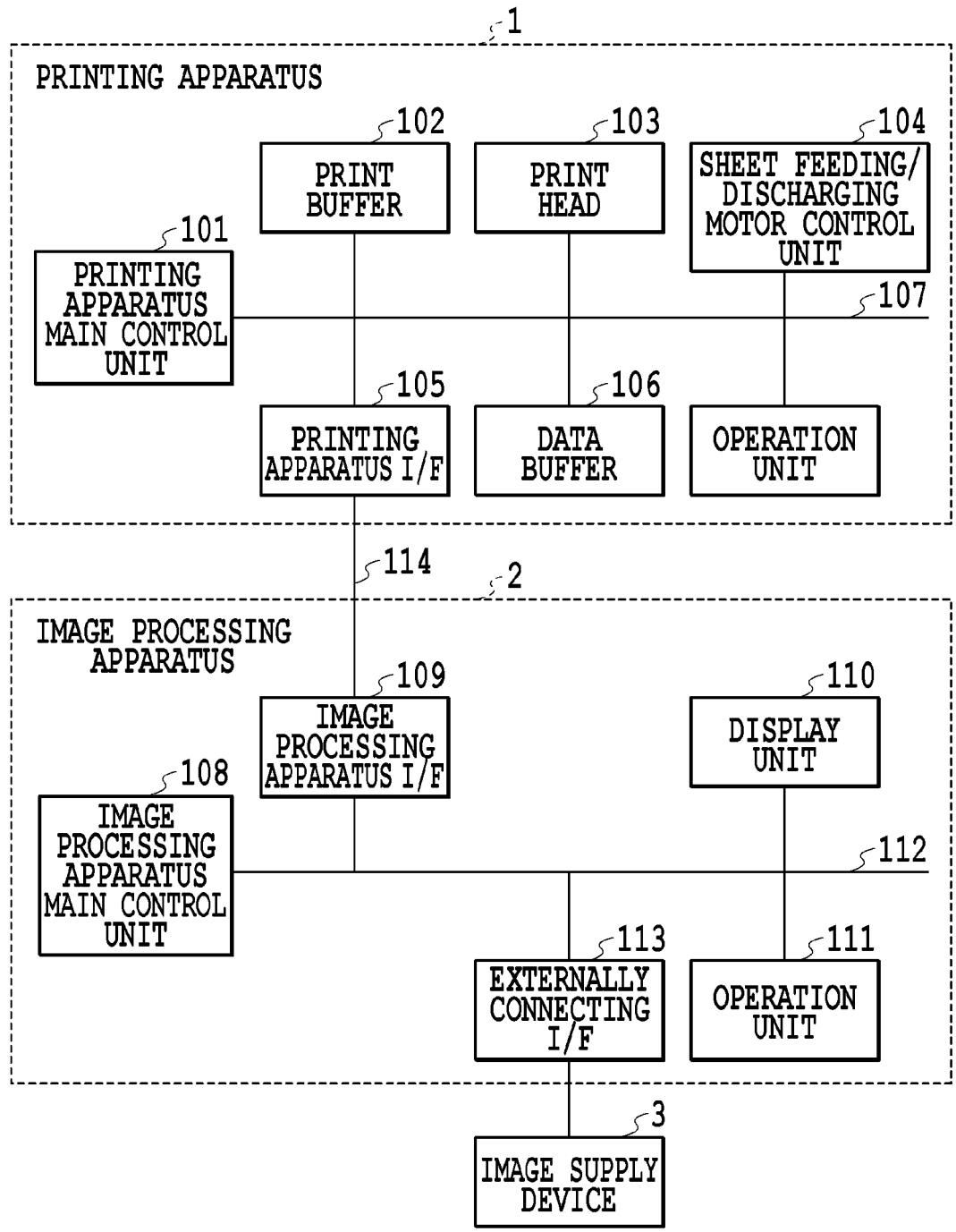
FIG. 1 is a block diagram illustrating the control configuration of an inkjet printing system.

FIG. 1 is a block diagram illustrating the control configuration of an inkjet printing system applicable to the present invention. The inkjet printing system in the present embodiment is configured to include an image supply device 3, an image processing apparatus 2, and an inkjet printing apparatus 1 (hereinafter also simply referred to as a printing apparatus). Image data supplied from the image supply device 3 is subjected to a predetermined image process in the image processing apparatus 2, then sent to the printing apparatus 1, and printed using inks as color materials.

In the printing apparatus 1, a printing apparatus main control unit 101 is one for controlling the whole of the printing apparatus 1, and configured to include a CPU, ROM, RAM, and the like. A print buffer 102 can store image data before a transfer to a print head 103 as raster data. The print head 103 is an inkjet type print head having multiple printing elements capable of ejecting inks as droplets, and in accordance with image data stored in the print buffer 102, ejects inks from respective printing elements. In the present embodiment, it is assumed that printing element arrays corresponding to three colors of cyan, magenta, and yellow are arrayed on the print head 103.

A sheet feeding/discharging motor control unit 104 controls conveyance of print media and sheet feeding/discharging. A printing apparatus interface (I/F) 105 transceives a data signal with the image processing apparatus 2. An I/F signal line 114 connects the both. As the I/F signal line 114, one specified by, for example, Centronics Data Computer Corporation can be applied. A data buffer 106 temporarily stores image data received from the image processing apparatus 2. A system bus 107 connects the respective functions of the printing apparatus 1.

Figure 5:
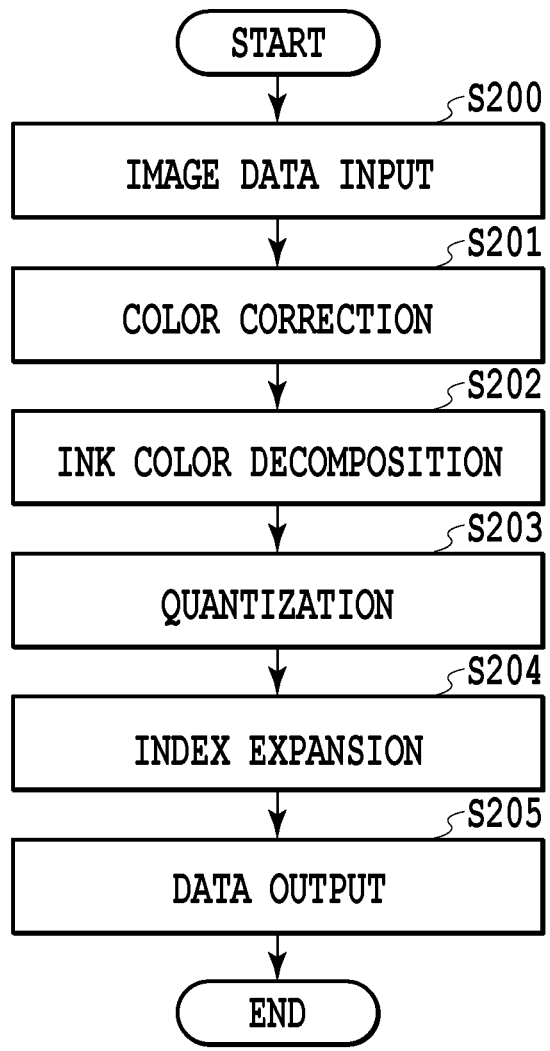
FIG. 5 is a flowchart for explaining an image data process.
Figure 6:
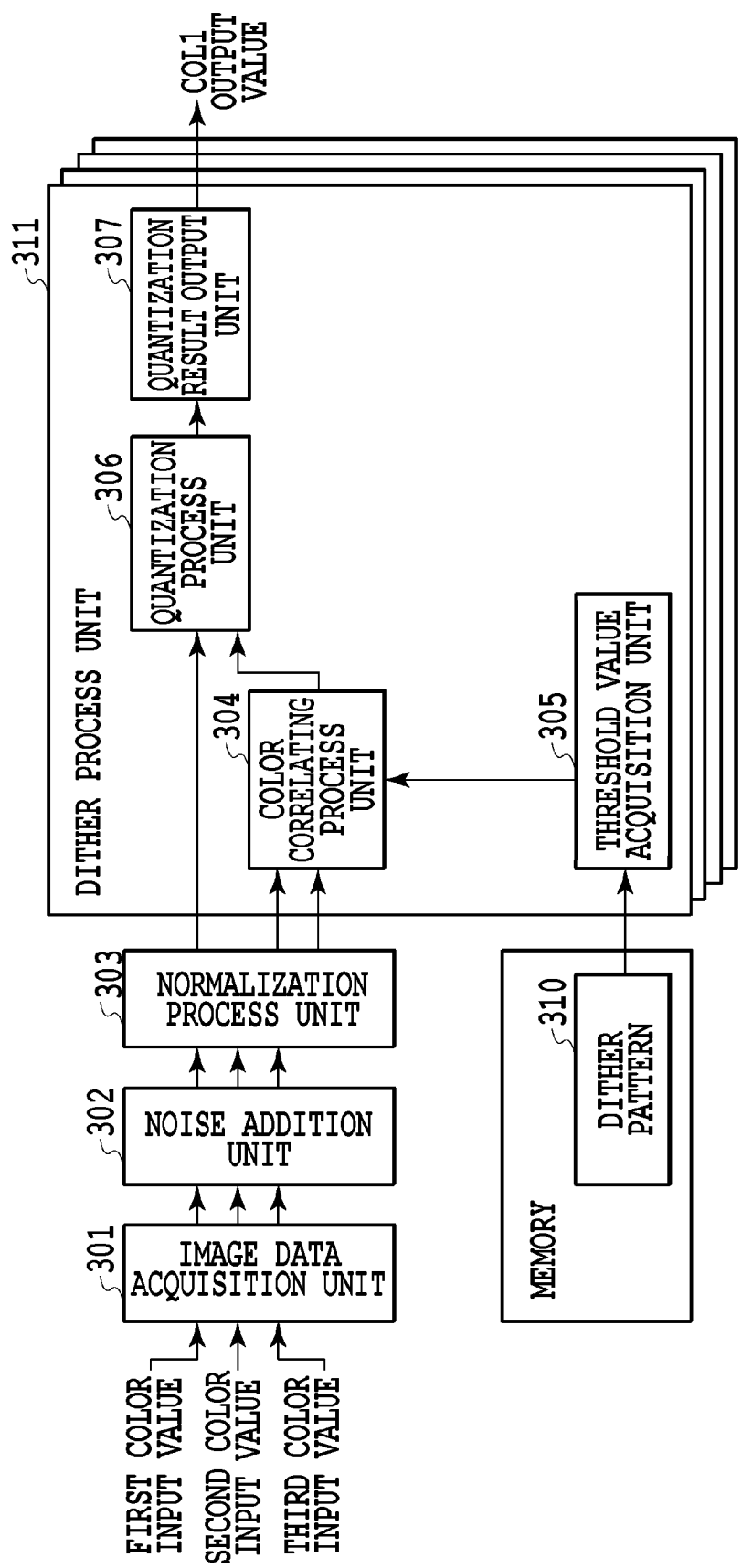
FIG. 6 is a block diagram for explaining the details of a quantization process.
Figure 7A:
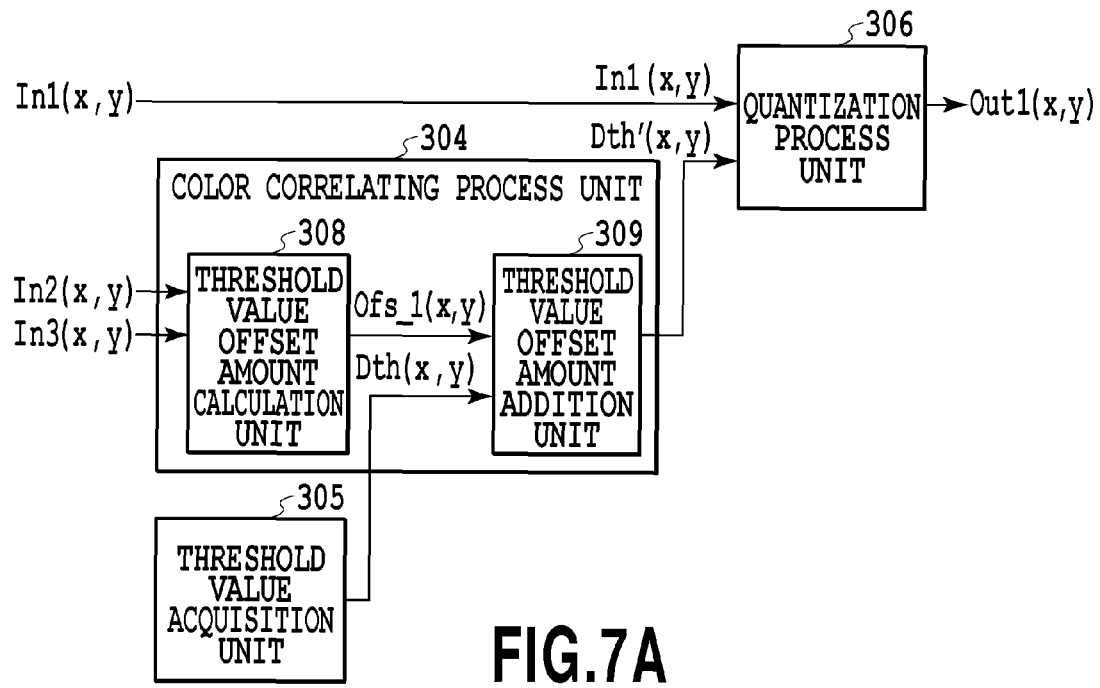
FIGS. 7A and 7B are block diagrams and a flowchart for explaining a process in a color correlating process unit.
Figure 7B:
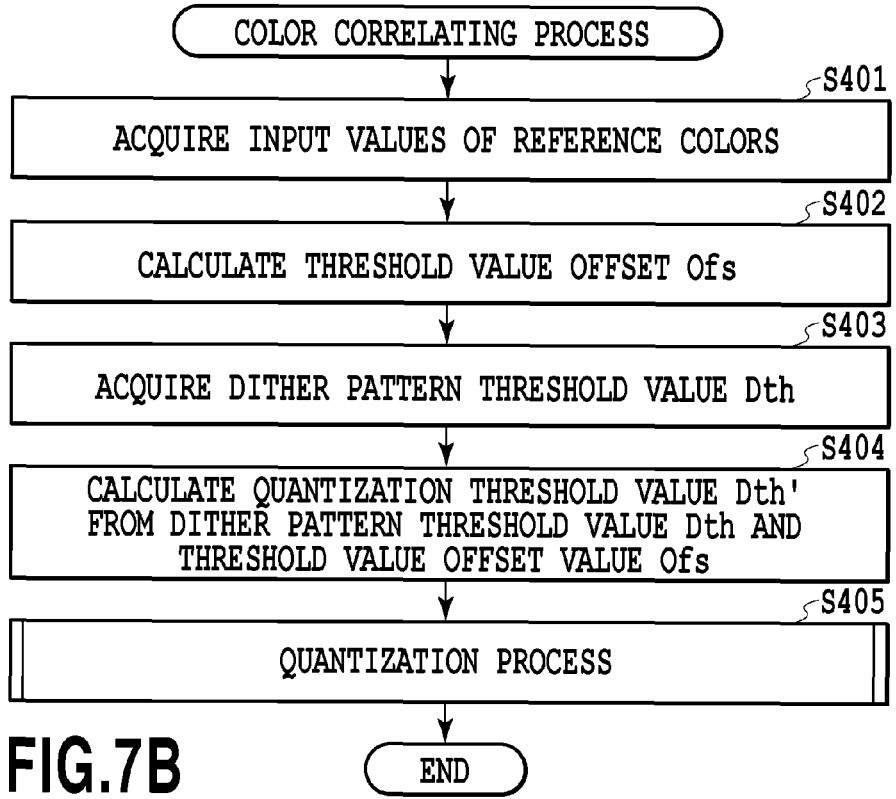

On the other hand, in the image processing apparatus 2, an image processing apparatus main control unit 108 is one for performing various processes on an image supplied from the image supply device 3, and thereby generating image data printable by the printing apparatus 1, and includes a CPU, ROM, RAM, and the like. The below-described characteristics configuration of the present invention illustrated in FIGS. 6 and 7A is also provided in the image processing apparatus main control unit 108, and flowcharts to be described with FIGS. 5 and 7B are performed by the CPU of the image processing apparatus main control unit 108. An image processing apparatus interface (I/F) 109 transceives a data signal with the printing apparatus 1. An externally connecting interface (I/F) 113 transceives image data and the like with the image supply device 3 externally connected. A display unit 110 displays various pieces of information to a user, and can be applied with a display such as an LCD. An operation unit 111 is a mechanism for a user to perform a command operation, and can be applied with, for example, a keyboard and a mouse. A system bus 112 connects the image processing apparatus main control unit 108 and the respective functions to each other.

Note that the printing apparatus 1 can also directly receive and print image data stored in a storage medium such as a memory card and image data from a digital camera in addition to image data supplied from the image processing apparatus 2.

Figure 2:
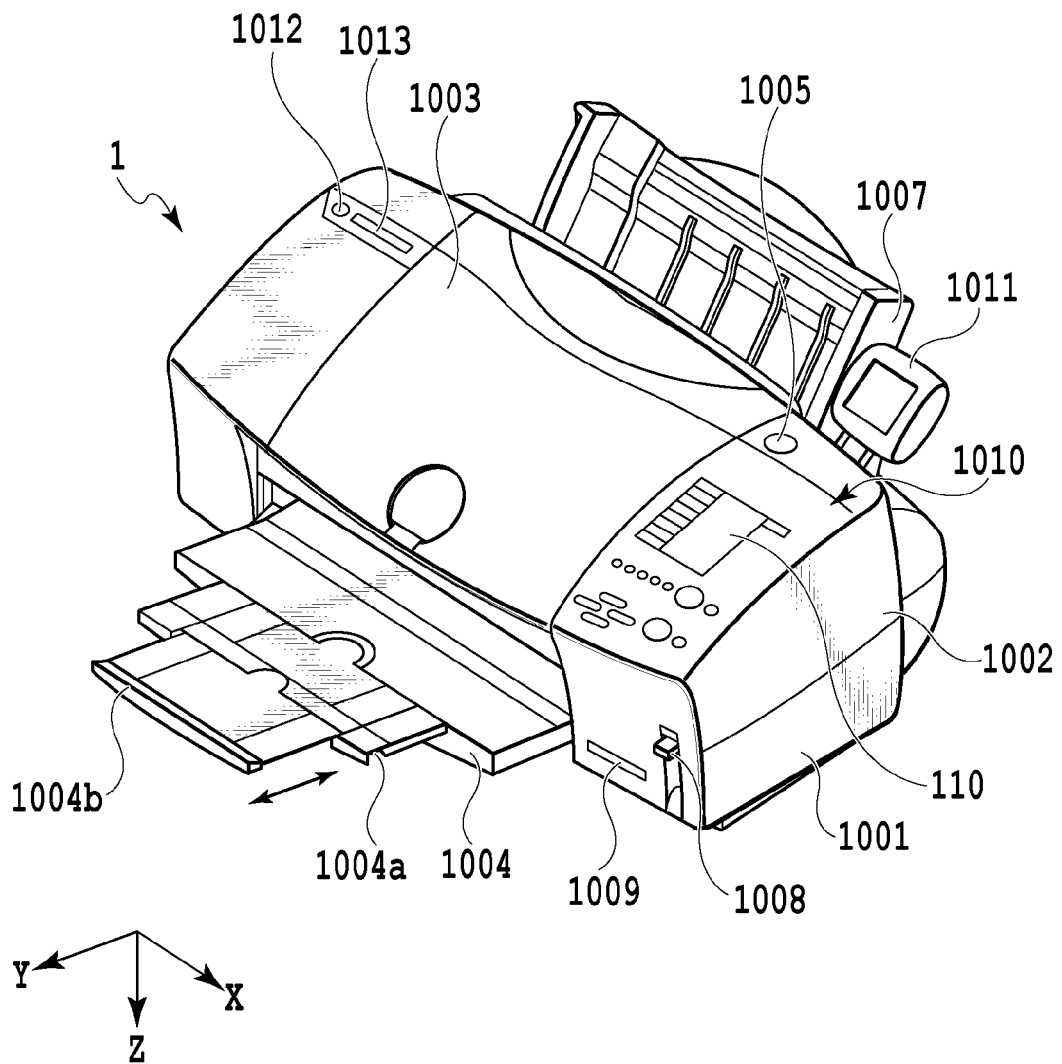
FIG. 2 is a schematic perspective view of a printing apparatus usable in the present invention.

FIG. 2 is a schematic perspective view of the printing apparatus 1 used in the present embodiment. The printing apparatus 1 includes a function as a typical PC printer, which receives data from the image processing apparatus 2 to print the data, and a function that prints image data stored in a storage medium such as a memory card and image data received from a digital camera.

A main body as the outer shell of the printing apparatus 1 has exterior members including a lower case 1001, upper case 1002, access cover 1003, paper feed tray 1007, and paper discharge tray 1004. The lower and upper cases 1001 and 1002 respectively form substantially the upper and lower halves of the main body of the apparatus 1, and by combining the both cases, a containing space that contains respective mechanisms inside is formed.

The paper feed tray 1007 is capable of stacking and holding multiple print media, and adapted to automatically feed the uppermost one medium into the apparatus when a feed print command is inputted. On the other hand, the paper discharge tray 1004 is adapted such that one end part thereof is rotationally movably held by the lower case 1001, and an opening part formed in the front part of the lower case 1001 can be opened/closed by the rotational movement. When performing a printing action, by rotationally moving the paper discharge tray 1004 toward the front side to open the opening part, printed sheets can be discharged through the opening part, and also the discharged printed sheets can be sequentially stacked. The paper discharge tray 1004 contains two auxiliary trays 1004a and 1004b, and by pulling out the respective trays as necessary, a print medium supporting area can be enlarged in three steps.

In the space inside the apparatus, the print head 103 for printing an image on a print medium, a carriage capable of mounting the print head 103 and ink tanks and moving in an X direction in the diagram, a conveyance mechanism adapted to convey a print medium in a Y direction by a predetermined amount per scan, and the like are disposed.

When a print command is inputted, a print medium conveyed from the paper feed tray 1007 into the apparatus is conveyed to an area where printing by the print head 103 is possible. Then, when one print scan by the print head 103 is finished, the conveyance mechanism conveys the print medium in the Y direction by a distance corresponding to a print width D. By repeating a print scan by the print head 103 and a print medium conveyance action as described, an image is formed on a print medium stepwise. The print medium on which printing has been completed is discharged to the paper discharge tray 1004.

The access cover 1003 is adapted such that one end part thereof is rotationally movably held by the upper case 1002, and an open part formed in the upper surface can be opened/closed. By opening the access cover 1003, the print head 103, an ink tank, and/or the like contained inside the main body can be replaced. Note that although not illustrated here, on the back surface of the access cover 1003, a protrusion for being detected by a micro switch provided on the main body side when the access cover 1003 is closed is disposed. That is, depending on a result of detecting the protrusion by the micro switch, an open/close state of the access cover 1003 can be detected.

On the upper surface of the upper case 1002, a power key 1005 is depressibly provided. Also, on the upper surface of the upper case 1002, an operation panel 1010 including the liquid crystal display unit 110, various key switches, and the like is provided.

A distance-to-paper selection lever 1008 is a lever for adjusting the interval between an ink ejection surface of the print head 103 and the surface of a print medium. A card slot 1009 is an opening part for receiving an adaptor attachable with a memory card. Image data stored in a memory card is sent to a control unit 3000 of the printing apparatus through an adaptor inserted into the card slot 1009, and after being subjected to a predetermined process, printed on a print medium. As the memory card (PC), a memory such as a compact flash memory, smart medium, or memory stick can be cited. A viewer 1011 (liquid crystal display unit) 1011 displays an image such as a one-frame based image or an index image when, for example, searching for an image desired to be printed from among images stored in the memory card. In the present embodiment, the viewer 1011 is adapted to be detachably attached to the printing apparatus 1 main body. A terminal 1012 is one for connecting a digital camera, and a terminal 1013 is a USB bus connector for connecting a personal computer (PC).

Figure 3:
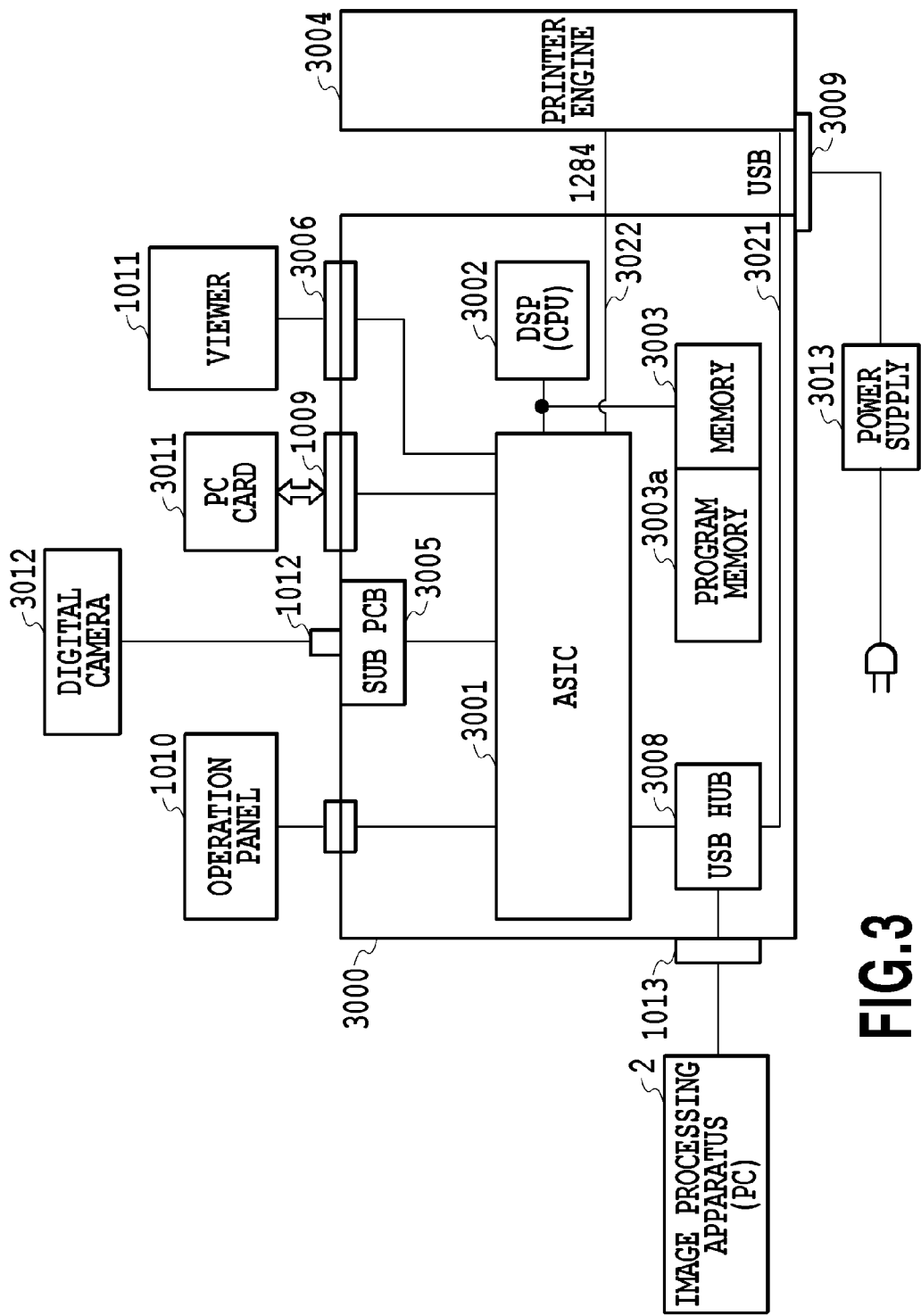
FIG. 3 is a block diagram for explaining the control configuration of the printing apparatus.

FIG. 3 is a block diagram for explaining the control configuration of the printing apparatus 1. In the control unit 3000 (control board), a DSP 3002 (digital signal processor) has a CPU inside, and performs various image processes and control of the whole of the printing apparatus. A memory 3003 has, in addition to a program memory 3003a adapted to store a program to be executed by the CPU of the DSP 3002, a RAM area adapted to store a program in execution and a memory area functioning as a work memory adapted to store image data and the like. In a printer engine 3004, a printer engine for printing a color image using color inks of multiple colors is equipped.

A USB bus connector 3005 is a port for connecting a digital camera 3012. A connector 3006 connects the viewer 1011. A USB bus hub 3008 (USB HUB) is a line concentrator for a USB transfer to the printer engine 3004. Upon receipt of image data having been subjected to the predetermined image process by the image processing apparatus 2 (PC) externally connected, the USB bus hub 3008 directly transmits the image data to the printer engine. In doing so, the PC 2 connected to the USB bus hub 3008 can directly transceive data or a signal with the printer engine 3004 (i.e., functions as a general PC printer).

A power connector 3009 is adapted to input DC voltage converted from commercial AC by a power supply 3013 into the apparatus. Note that a signal between the control unit 3000 and the printer engine 3004 is transceived through a USB bus 3021 or an IEEE 1284 bus 3022.

Figure 4:
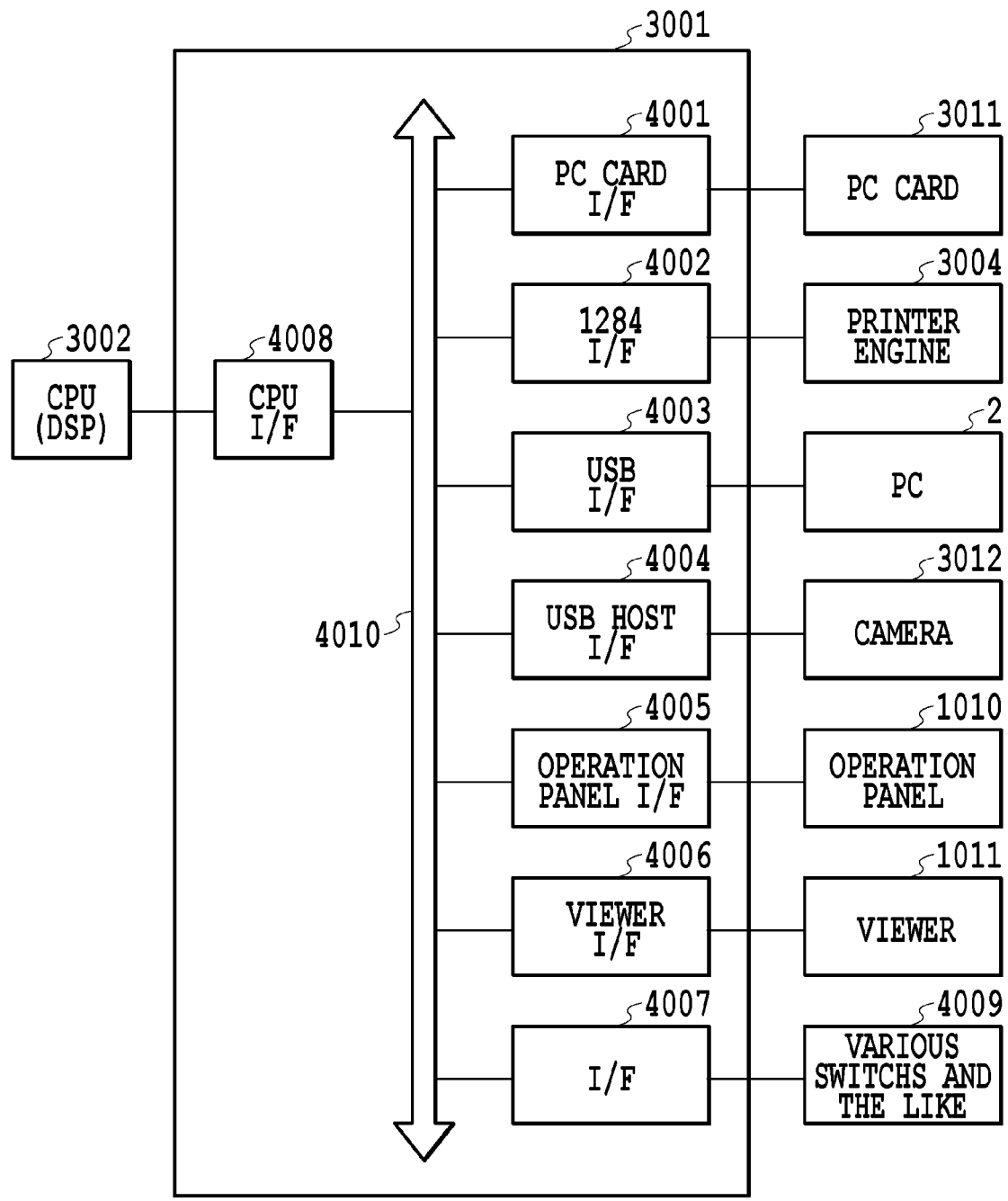
FIG. 4 is a block diagram illustrating the configuration of an ASIC 3001.

FIG. 4 is a block diagram illustrating the configuration of an ASIC 3001. A PC card interface unit 4001 is adapted to read image data stored in an attached PC card 3011 or write data into the PC card 3011. The IEEE 1284 interface unit 4002 is adapted to transceive data with the printer engine 3004. The IEEE 1284 interface unit 4002 is a bus that is used when recording image data stored in the digital camera 3012 or in the PC card 3011. A USB interface unit 4003 is adapted to transceive data with the PC 2. A USB host interface unit 4004 is adapted to transceive data with the digital camera 3012. An operation panel interface unit 4005 is adapted to input various operation signals from the operation panel 1010 or output display data to a display unit 110. A viewer interface unit 4006 is adapted to control displaying image data on the viewer 1011. An interface 4007 is an interface unit adapted to control various switches and LEDs and the like 4009. A CPU interface unit 4008 is adapted to control data transception with the DSP 3002. These respective units are connected through an internal bus (ASIC bus) 4010. A control program for them is configured in a multitasking form adapted to assign tasks on a function module basis.

FIG. 5 is a flowchart for explaining an image data process performed by the image processing apparatus main control unit 108 in the present embodiment. This process is performed by the CPU of the image processing apparatus main control unit 108 in accordance with a program stored in the ROM. In FIG. 5, when image data on a target pixel is inputted from the image supply device 3 (Step S200), the image processing apparatus main control unit 108 first makes a color correction in Step S201. The image data received by the image processing apparatus 2 from the image supply device 3 includes pieces of R (red), G (green), and B (blue) 8-bit luminance data for expressing standardized color space such as sRGB. In Step S201, these pieces of luminance data are converted to pieces of RGB 12-bit luminance data corresponding to color space specific to the printing apparatus. As a method for converting a signal value, a publicly known method such as a method that refers to a lookup table (LUT) preliminarily stored in the ROM or the like can be employed.

In Step S202, the image processing apparatus main control unit 108 decomposes the converted pieces of RGB data to pieces of 16-bit gradation data (density data) respectively for C (cyan), M (magenta), and Y (yellow) that are the ink colors of the printing apparatus. In this step, a 16-bit gray image is generated for each of three channels (three colors). In the ink color decomposition process as well, a lookup table (LUT) preliminarily stored in the ROM or the like can be referred to as in the color correction process.

In Step S203, the image processing apparatus main control unit 108 performs a predetermined quantization process on the pieces of 16-bit gradation data respectively corresponding to the ink colors to convert to pieces of several bit quantized data. For example, in the case of quantization into ternary data, the image processing apparatus main control unit 108 converts the pieces of 16-bit gradation data to pieces of 2-bit data corresponding to any of Level 0 to Level 2. The quantization process will be described later in detail.

In subsequent Step S204, the image processing apparatus main control unit 108 performs an index expansion process. Specifically, from among multiple dot arrangement patterns where the number of dots to be printed in each pixel and a corresponding position are determined, one dot arrangement pattern is selected related to the level obtained in Step S203. When doing this, the dot arrangement pattern may be in a form where the number of dots to be printed in an area corresponding to each pixel is changed depending on the level value or the size of a dot is changed depending on the level value.

Upon completion of such an index expansion process, resultant pieces of dot data are outputted as pieces of binary data (Step S205). This completes the image data process.

Note that the respective processing steps in Steps S200 to S205 of FIG. 5 are performed by the inkjet printing system in the present embodiment; however, between one group of steps from Step S200 to a certain step to be performed by the image processing apparatus 2 and the other group of steps from the certain step to Step S205 to be performed by the printing apparatus 1, a clear line is not particularly determined. For example, when the image processing apparatus 2 performs the steps up to the quantization, it is only necessary that the image processing apparatus 2 transfers the pieces of quantized data to the printing apparatus 1, and the printing apparatus main control unit 101 performs the index expansion in Step S204 using an index pattern stored in a memory and controls the printing action. Also, depending on the performance of the printing apparatus 1, the printing apparatus 1 can also directly receive the pieces of RGB multivalued image data to perform all the processing steps in Step S201 to S204.

FIG. 6 is a block diagram for explaining the details of the quantization process performed in Step S203 of FIG. 5. In the quantization process in the present embodiment, an input value is first processed, then a threshold value is processed, and finally the quantization process based on a dither method is performed. These series of processes are parallel performed on a color basis (on a channel basis). In the following, each of the processes will be described in detail with reference to FIG. 6.

An image data acquisition unit 301 acquires pieces of 16-bit gradation data indicating the density of each pixel. It is assumed that the image data acquisition unit 301 in the present embodiment can receive signals having at most 16 bits for eight colors. The diagram illustrates a state where the pieces of 16-bit data respectively corresponding to first to third colors are inputted.

A noise addition process unit 302 adds predetermined noise to the pieces of 16-bit gradation data. By adding the noise, even when pieces of gradation data of the same level are continuously inputted, a state where the same patterns are continuously arranged can be avoided to reduce a stripe, texture, and the like. The noise addition process unit 302 multiplies a predetermined random table, fixed intensity, and variable intensity corresponding to an input value, and thereby noise is generated for each pixel and added to the input value. Note that the random table is a table adapted to set the polarity of noise, and sets a plus, zero, or a minus for each pixel position. The random table in the present embodiment can have at most eight faces, and the size of each table can be arbitrarily set. The fixed intensity indicates the intensity of a noise amount, and the magnitude of the intensity determines the magnitude of the noise. In the present embodiment, by setting a random table or fixed intensity optimum for each print mode depending on the degrees of the graininess, stripe and texture of an image, and the like, a noise amount can be appropriately adjusted.

A normalization process unit 303 relates a gradation value of each pixel represented by 16 bits to a level value enabling the index expansion in Step S204, and then normalizes each level range to 12 bits. In the following, a specific description will be given. When the index expansion process in Step S204 is a process corresponding to n values from Level 0 to Level (n-1), the normalization process unit 303 equally divides 65535 gradations represented by 16 bits into (n-1). Further, a range corresponding to each level is normalized to 12 bits (4096 gradations). This makes it possible to, for each pixel, obtain pieces of 12-bit data related to any of Level 0 to Level (n-1).

For example, in the case where the index expansion process corresponds to three values of Level 0, Level 1, and Level 2, the normalization process unit 303 equally divides the 65535 gradations represented by 16 bits into two. Then, the normalization process unit 303 normalizes respective ranges corresponding to gradation values of 0 to 32767 and gradation values of 32768 to 65535 to 12 bits (0 to 4095 gradations). For a pixel corresponding to any of the input gradation values of 0 to 32767 as the first range, Level 0 or Level 1 is outputted by the subsequent quantization process, whereas for a pixel corresponding to any of the input gradation values of 32768 to 65535 as the second range, Level 1 or Level 2 is outputted by the subsequent quantization process. In accordance with the above-described control, even when a quantization number (n) is any number, the subsequent quantization process can be performed in the same manner.

The processes in the image data acquisition unit 301 to the normalization process unit 303 described above are parallel performed on the pieces of gradation data of the respective colors. That is, in the present embodiment, the pieces of 12-bit data corresponding to cyan, magenta, and yellow are generated, and inputted to a dither process unit 311.

In the dither process unit 311, 12-bit data to be quantized (processing target data) is directly transmitted to a quantization process unit 306. On the other hand, pieces of 12-bit data of colors other than the processing target data are inputted to a color correlating process unit 304 as pieces of reference data. The color correlating process unit 304 performs a predetermined process on a threshold value acquired by a threshold value acquisition unit 305 on the basis of the pieces of reference data to determine a final threshold value, and transmits the final threshold value to the quantization process unit 306. The quantization process unit 306 compares the processing target data with the threshold value inputted from the color correlating process unit 304, and thereby determines printing (1) or non-printing (0).

The threshold value acquisition unit 305 selects one corresponding threshold value matrix from among multiple dither patterns 310 stored in a memory such as the ROM, and acquires a threshold value corresponding to a pixel position associated with the processing target data. In the present embodiment, the dither patterns 310 are threshold value matrices formed by arraying threshold values of 0 to 4095 so as to have blue noise characteristics, and can provide various sizes and shapes such as 512×512 pixels, 256×256 pixels, and 512×256 pixels. That is, the memory preliminarily stores the multiple threshold value matrices having different sizes and shapes as described, and the threshold value acquisition unit 305 selects a threshold value matrix corresponding to a print mode and an ink color from among the multiple threshold value matrices. Then, the threshold value acquisition unit 305 provides a threshold value corresponding to the pixel position (x, y) associated with the processing target data to the color correlating process unit 304 from among multiple threshold values arrayed in the selected threshold value matrix.

The present invention is characterized by a color correlating processing method in the color correlating process unit 304. Before describing the characteristic color correlating processing method, a typical color correlating process as disclosed in U.S. Pat. No. 6,867,884 will be first described here.

FIGS. 7A and 7B are block diagrams and flowcharts for explaining a processing configuration and processing steps in the color correlating process unit 304. The color correlating process unit 304 sets the pieces of 12-bit data corresponding to the colors other than the processing target data as the pieces of reference data, uses these pieces of reference data to perform the predetermined process on the threshold value acquired by the threshold value acquisition unit 305, and calculates the threshold value for quantizing the processing target data. For example, when the processing target data is 12-bit data of cyan, the pieces of reference data are pieces of 12-bit data of magenta and yellow. In FIG. 7A, the processing target data is denoted by In1(x, y), and the pieces of reference data are denoted by In2(x, y) and In3(x, y). Here, (x, y) represents the pixel position, which serves as a coordinate parameter for the threshold value acquisition unit 305 to select the threshold value corresponding to the pixel position associated with the processing target data from the threshold value matrix.

Referring to FIG. 7A, the pieces of reference data In2(x, y) and In3(x, y) inputted to the color correlating process unit 304 are first inputted to a threshold value offset amount calculation unit 308 (Step S401). In doing so, the threshold value offset amount calculation unit 308 uses these pieces of reference data to calculate a threshold value offset Ofs_1(x, y) for the processing target data In1(x, y) (Step S402). In the present embodiment, the threshold value offset value Ofs_1 (x, y) is calculated using Expression 2.

$$Ofs\_1(x, y) = \Sigma i[Ini(x, y)]$$ Expression 2

Here, i represents a parameter for individually indicating, between the pieces of reference data In2(x, y) and In3(x, y), one or more pieces of reference data (hereinafter referred to as pieces of actual reference data) used to obtain the threshold value for the processing target data In1. The number and type of such pieces of actual reference data are predesignated for each processing target data.

In the present embodiment, it is assumed that in the case where the processing target data is In1(x, y), a null is the actual reference data, and in the case where the processing target data is In2(x, y), In1(x, y) is the actual reference data. It is also assumed that in the case where the processing target data is In3(x, y), In1(x, y) and In2(x, y) are the pieces of actual reference data. Accordingly, offsets Ofs_1(x, y) to Ofs_3(x, y) for the respective pieces of processing target data In1(x, y) to In3(x, y) can be expressed as follows in accordance with Expression 2.

$$Ofs\_1(x, y) = \Sigma i[In(x, y)]$$ Expression 2-1
$$= 0$$

$$Ofs\_2(x, y) = \Sigma i[In(x, y)]$$ Expression 2-2
$$= In1(x, y)$$

$$Ofs\_3(x, y) = \Sigma i[In(x, y)]$$ Expression 2-3
$$= In1(x, y) + In2(x, y)$$

As described, when the threshold value offset values Ofs_1(x, y) to Ofs_3(x, y) are calculated, these values are inputted to a threshold value offset amount addition unit 309. The threshold value offset amount addition unit 309 acquires a threshold value Dth corresponding to the coordinates (x, y) of processing target data In (x, y) from the threshold value acquisition unit 305 (Step S403).

In Step S404, the threshold value offset amount addition unit 309 subtracts the threshold value offset value Ofs_1(x, y) inputted from the threshold value offset amount calculation unit 308 from the threshold value Dth(x, y) inputted from the threshold value acquisition unit 305 to obtain a quantization threshold value Dth' (x, y).

$$Dth'(x, y) = Dth(x, y) - Ofs\_1(x, y)$$ Expression 3

When doing this, in the case where Dth' (x, y) takes a minus value, Dth_max (the maximum value among threshold values in the dither pattern) is added, and a resultant value is treated as the quantization threshold value Dth' (x, y). In doing so, the quantization threshold value Dth' is constantly Dth'=0 to Dth_max.

That is, in the case where Dth' (x, y)<0, the following expression holds:

$$Dth'(x, y) = Dth'(x, y) + Dth\_max$$ Expression 4

When the quantization threshold value Dth' (x, y) is obtained in accordance with Expression 3 or 4, the quantization process unit 306 compares the processing target data In1(x, y) and the quantization threshold value Dth' (x, y) to determine dot printing (1) or non-printing for the pixel position (x, y). This completes the processing steps.

After that, as described with the flowchart in FIG. 5, quantized data Out1(x, y) represented by several bits is subjected to the index expansion process, and a dot pattern to be printed at the pixel position (x, y) is determined. When doing this, the number of dots (or the size of a dot) to be printed at the pixel position (x, y) is set to be a number corresponding to a level value, such as one dot (or a small dot) when the level value is 1, or two dots (or a large dot) when the level value is 2.

Figure 8:
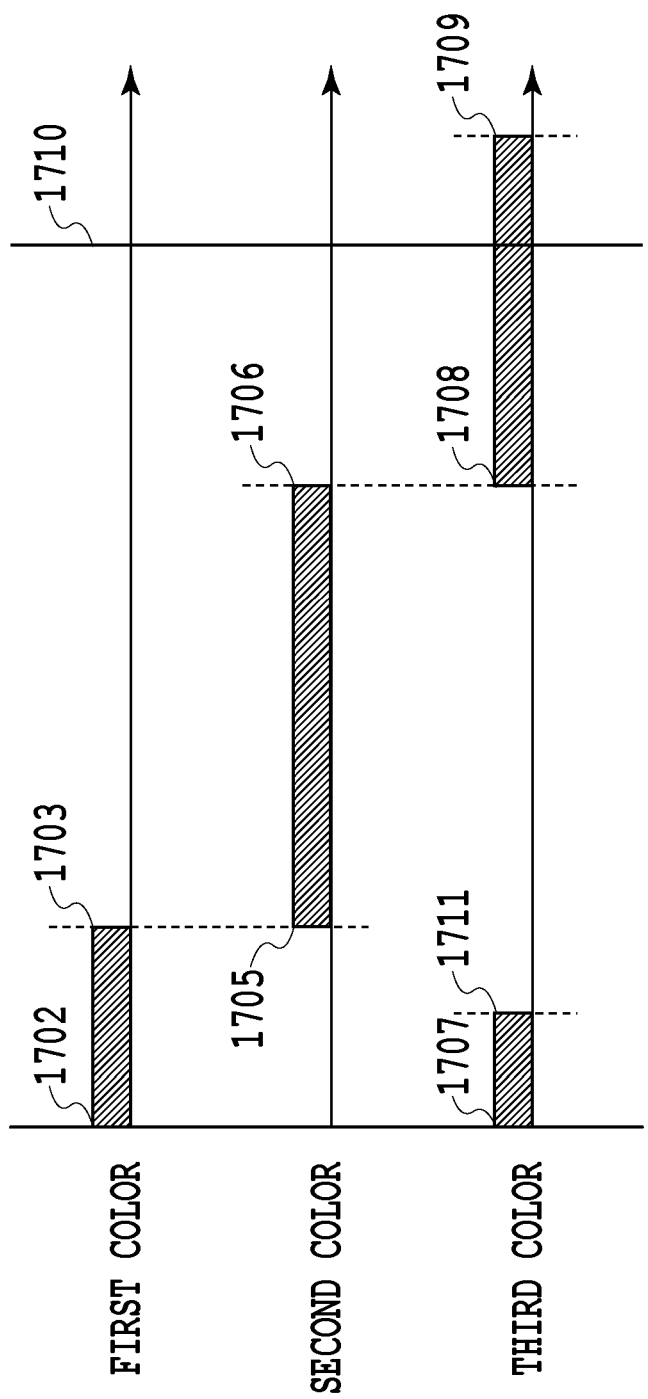
FIG. 8 is a diagram illustrating threshold value ranges determined as printing (1) by a typical color correlating process.

FIG. 8 is a diagram illustrating threshold value ranges determined as printing (1) among the multiple threshold values 0 to Dth_max arranged in the threshold value matrix when the first to third pieces of multi-valued data (In1 to In3) are respectively inputted for the first to third colors. The horizontal axis represents a threshold value Dth0 to 4094, and "1710" represents Dth_max (the maximum value among the threshold values in the dither pattern). Each thick line indicates a threshold value range where dots are arranged. In the present embodiment, the offset for the first color is Ofs_1=0 from Expression 2-1. Accordingly, pixel positions corresponding to threshold values of 0 to In1 (1702 to 1703) among 0 to Dth_max are set to printing (1).

The offset for the second color is Ofs_2=In1 from Expression 2-2. Accordingly, as a result of quantization using the threshold value Dth' obtained in accordance with Expressions 3 and 4, threshold values of In1 to In1+In2 (1705 to 1706) among the threshold values 0 to Dth_max arrayed in the dither pattern 310 are set to printing (1).

The offset for the third color is Ofs_3=In1+In2 from Expression 2-3. Accordingly, as a result of quantization using the threshold value Dth' obtained in accordance with Expressions 3 and 4, In1+In2 to In1+In2+In3 (1708 to 1709) among the threshold values 0 to Dth_max arrayed in the threshold value matrix are set to printing (1). Note that in this example, (In1+In2+In3) is assumed to exceed Dth_max. In this case, a range exceeding Dth_max is treated as follows. That is, a range corresponding to the remainder obtained by dividing (In1+In2+In3) by Dth_max, i.e., threshold values of 0 to In1+In2+In3−Dth_max are set to printing (1). In other words, In1+In2 to Dth_max (1708 to 1710) and 0 to In1+In2+In3−Dth_max (1707 to 1711) are threshold value ranges determined as printing (1).

As described, in the typical color correlating process, despite using the common threshold value matrix, the quantization threshold values Dth' specific to the respective colors are obtained by setting the mutual input values as the offset values. Further, by using the newly obtained quantization threshold values Dth' for the quantization process, dots can be arranged such that a dot print pattern where the multiple colors are mixed has blue noise characteristics.

However, as has been already described, if a color having strong dot power is present in a mixed color dot pattern of multiple colors, the graininess of a dot pattern of that color is conspicuous and as a result, image quality may be deteriorated. Note that dot power corresponds to the conspicuousness of one dot, and depends on, for example, the lightness of one dot printed on a print medium. In addition, a dot having lower lightness (higher density) has stronger dot power, and even when forming a dot pattern having blue noise characteristics together with the other colors, if a dot pattern of that color does not have blue noise characteristics, graininess is conspicuous.

Figure 9A:
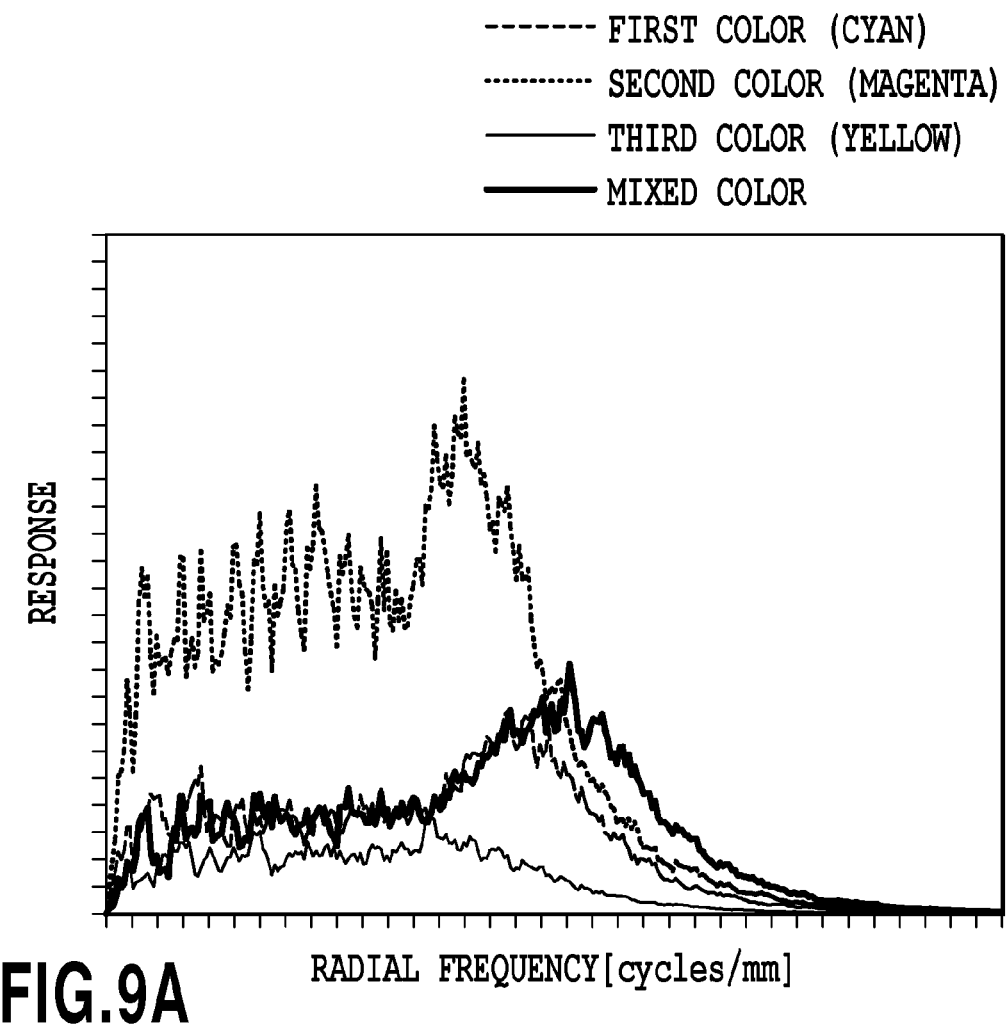
FIGS. 9A and 9B are diagrams quantitatively illustrating the graininesses of respective dot patterns.
Figure 9B:
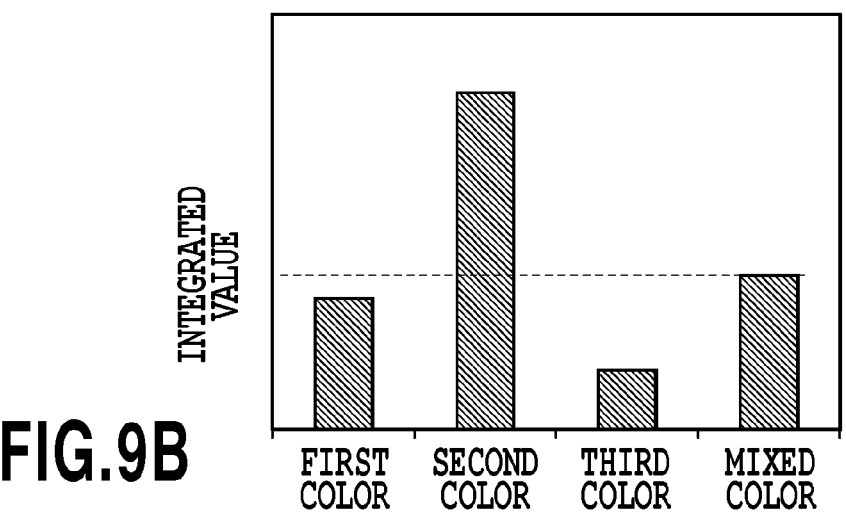

FIGS. 9A and 9B are diagrams quantitatively illustrating the graininesses of respective dot patterns formed when in the above-described typical color correlating process, setting the first color to cyan, the second color to magenta, and the third color to yellow. FIG. 9A illustrates the response values of the dot patterns of the respective colors and mixed color, and FIG. 9B illustrates their integrated values. Each of the response values corresponds to a result of multiplying the frequency characteristics of a corresponding dot pattern by the human visual characteristics (VTF) and a corresponding dot power coefficient. For the human visual characteristics (VTF), the Dooley approximate expression already given by Expression 1 is used. Also, a dot power coefficient has a value comparable to the intensity of dot power, and increases as lightness is decreased. Here, as an example, dot power coefficients for the respective colors are set from the lightness of cyan L*=55, the lightness of magenta L*=55, and the lightness of yellow L*=85 in CIEL*a*b* color space.

The mixed color dot pattern and the dot pattern of cyan as the first color have blue noise characteristics, and therefore the response values and their integrated values are relatively low values. Also, the dot pattern of yellow as the third color does not have blue noise characteristics; however, dot power is small as compared with those of cyan and magenta, and therefore the response value and its integrated value are sufficiently low values. On the other hand, the dot pattern of magenta as the second color does not have blue noise characteristics but has strong dot power, and therefore the response value and its integrated value are relatively high values.

As a result of intensive examination, in consideration of the above points, the present inventors have determined that when the response value of a dot pattern of a specific color exceeds the response value of a mixed color dot pattern, graininess tends to be visually easily perceived. In addition, the present inventors have gained the knowledge that in order to suppress the graininess of the whole of an image, it is effective to set a threshold value matrix and reference colors in the color correlating process so as to make the response value of a dot pattern of each ink color smaller than the response value of a mixed color dot pattern. In the following the color correlating process characteristic of the present embodiment will be described.

Referring to FIGS. 7A and 7B again, in the present embodiment, when the processing target data is the cyan data In1(x, y), the threshold value acquisition unit 305 selects a first threshold value matrix having blue noise characteristics. Also, the threshold value offset amount calculation unit 308 sets the threshold value offset value, i.e., the reference data to null.

$$Ofs\_1(x, y)=0$$

When the processing target data is the magenta data In2(x, y), the threshold value acquisition unit 305 selects a second threshold value matrix that has blue nose characteristics but is different from the first threshold value matrix. The threshold value offset amount calculation unit 308 sets the threshold value offset value, i.e., the reference data to null.

$$Ofs\_2(x, y)=0$$

When the processing target data is the yellow data In3(x, y), the threshold value acquisition unit 305 selects the second threshold value matrix as in the case of In2(x, y). The threshold value offset amount calculation unit 308 sets the threshold value offset value, i.e., the reference data to In2(x, y).

$$Ofs\_3(x, y)=Ofs\_2(x, y)$$

The threshold value offset amount addition unit 309 subtracts the threshold value offset value Ofs_1(x, y) inputted by the threshold value amount calculation unit 308 from the threshold value Dth(x, y) in the threshold value matrix selected by the threshold value acquisition unit 305 to obtain the quantization threshold value Dth' (x, y). After that, the same process as the already described regular color correlating process is performed.

FIG. 22 is an example of the first and second threshold value matrices employable in the present embodiment. Any of the threshold value matrices has blue noise characteristics, but a threshold value distribution is different from each other. These two matrices are not particularly limited as long as having blue noise characteristics, and may have or may not have correlation. Note that a blue dot formed by superposing a cyan dot and a magenta dot has stronger dot power than the cyan dot or the magenta dot, and therefore mutual threshold values are preferably set so as to prevent the occurrence of such a blue dot as much as possible. In addition, the first threshold value matrix and the second threshold value matrix may be two matrices having a relationship in which the same threshold value matrix is mutually shifted vertically or horizontally.

Figure 10:
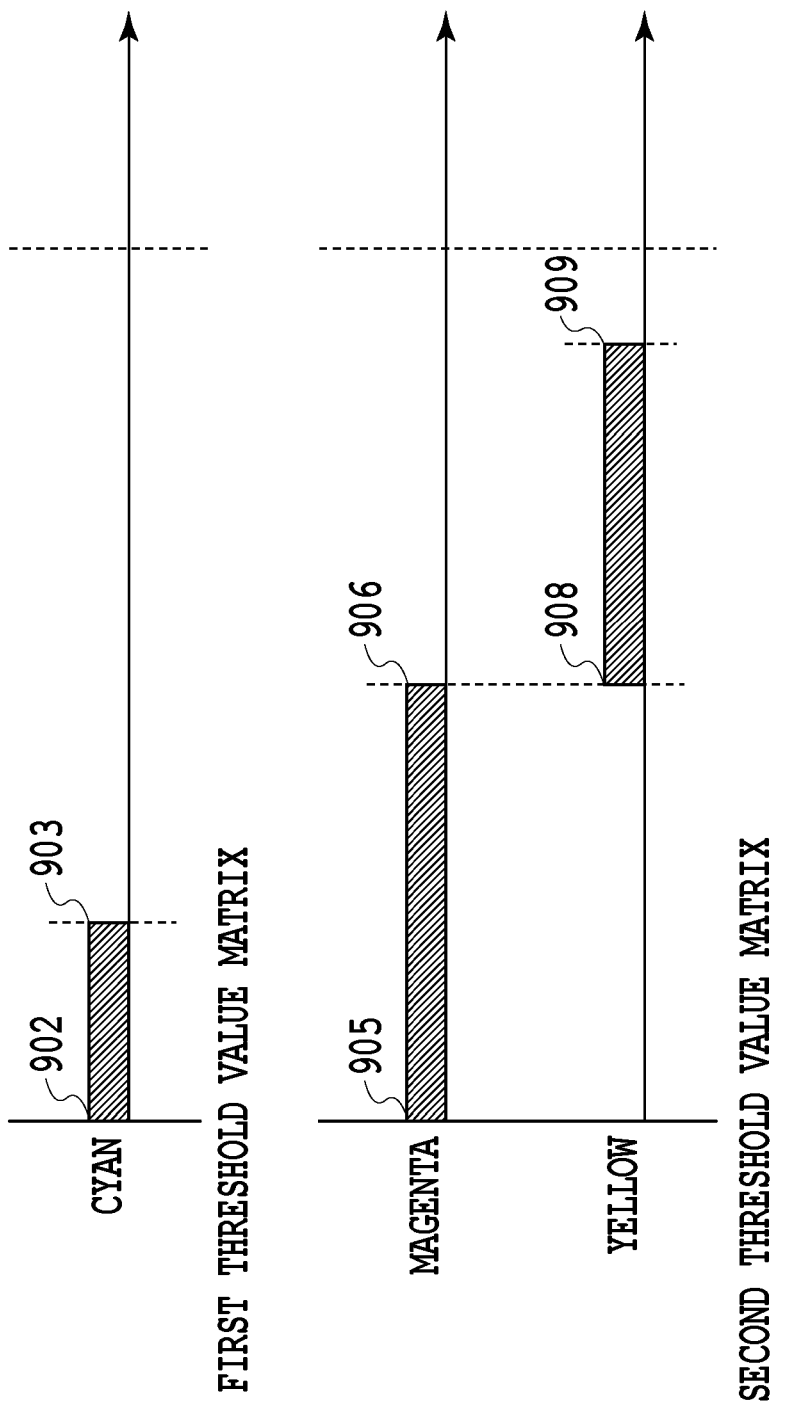
FIG. 10 is a diagram illustrating threshold value ranges determined as printing (1) in a first embodiment.

FIG. 10 is a diagram illustrating threshold value ranges determined as printing (1) in the threshold value matrices for the respective colors. In the present embodiment, in the case of cyan as the first color, the threshold value offset value is Ofs_1=0. Accordingly, pixel positions corresponding to 0 to In1 (902 to 903) among the threshold values of 0 to Dth_max in the first threshold value matrix are set to printing (1).

In the case of magenta as the second color as well, the threshold value offset value is Ofs_2=0. Accordingly, pixel positions corresponding to threshold values of 0 to In2 (905 to 906) among 0 to Dth_max in the second threshold value matrix are set to printing (1).

In the case of yellow as the third color, the threshold value offset value is Ofs_3=In2. Accordingly, In2 to In2+In3 (908 to 909) among the threshold values of 0 to Dth_max in the second threshold value matrix are set to printing (1).

According to the present embodiment as described, the dot patterns of cyan and magenta both having relatively strong dot power, and the mixed color dot pattern of magenta and yellow can have blue noise characteristics.

Figure 11A:
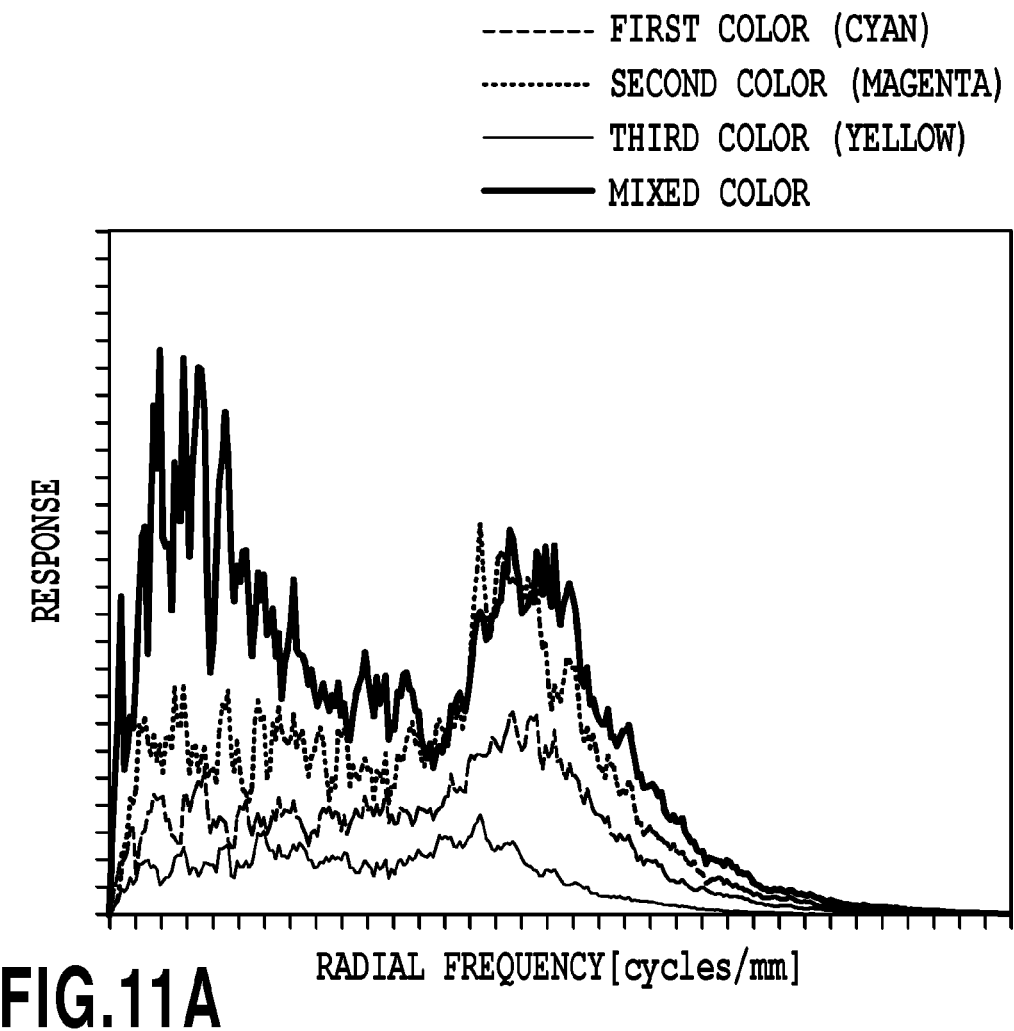
FIGS. 11A and 11B are diagrams quantitatively illustrating the graininesses of respective dot patterns.
Figure 11B:
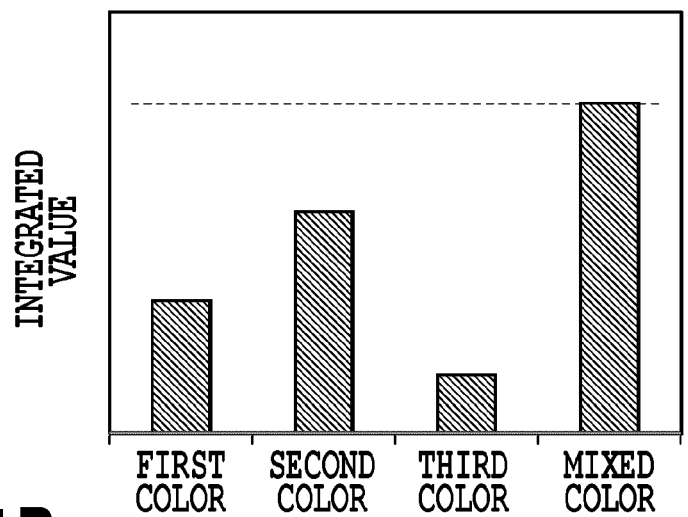

FIGS. 11A and 11B are diagrams quantitatively illustrating the graininesses of the respective dot patterns in the present embodiment in the same manner as in the case of the conventional typical color correlating process illustrated in FIGS. 9A and 9B. FIG. 11A illustrates the response values of the dot patterns of the ink colors and the mixed color dot pattern, and FIG. 11B illustrates their integrated values. The dot pattern of cyan as the first color and the dot pattern of magenta as the second color have blue noise characteristic, and the response values and their integrated values are relatively low values. Also, the dot pattern of yellow as the third color does not have blue noise characteristics; however, as compared with cyan or magenta, dot power is very small, and therefore the response value and its integrated value are sufficiently low values. On the other hand, the mixed color dot pattern of cyan, magenta, and yellow is configured to include the superposition of the two dot patterns each having the blue noise characteristics, and therefore as compared with the conventional color correlating process, the response value and its integrated value are slightly high. However, as compared with the case where the color correlating process is not employed at all, the response value and its integrated value, i.e., graininess can be kept sufficiently low.

Figure 12A:
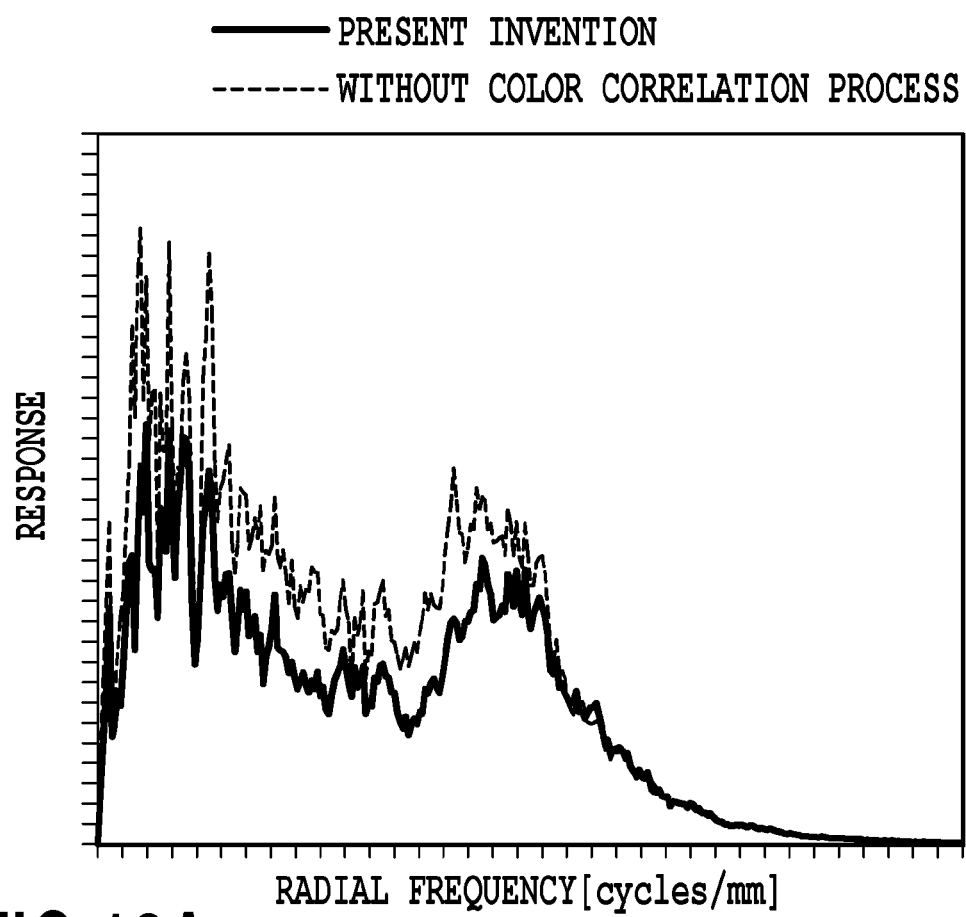
FIGS. 12A and 12B are diagrams illustrating a comparison of graininess between the present embodiment and a conventional method.
Figure 12B:
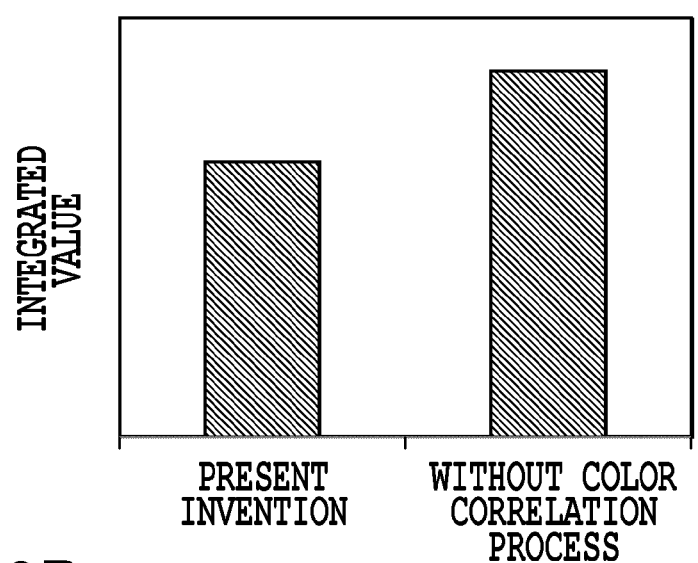

FIGS. 12A and 12B are diagrams that compare the graininess of a mixed color dot pattern between when using a mutually uncorrelated threshold value matrix for each of cyan, magenta, and yellow without employing any color correlating process and when employing the present embodiment. It turns out that as compared with the case of the mixed color dot pattern based on the conventional method, in the case of the mixed color dot pattern in the present embodiment, a response value and its integrated value are both kept low.

That is, according to the present embodiment, while sufficiently suppressing the graininess of the mixed color dot pattern of cyan, magenta, and yellow, the response value of a dot pattern of each of the colors can be kept further lower than the response value of the mixed color dot pattern. As a result, a smooth image can be outputted with the graininess of the whole of the image kept lower than before.

In addition, as long as the superposition of dots between different colors is suppressed, regardless of the frequency characteristics of a mixed color dot pattern, graininess can be suppressed to some extent. For this reason, even if the second threshold value matrix common to two colors does not necessarily have blue noise characteristics, the graininess of the whole of an image can be kept lower than before. Also, in order to avoid the superposition of dots, it is not necessarily required to perform the color correlating process between two colors, but it is only necessary to devise a threshold value setting method so as to set threshold value ranges that are as mutually exclusive as possible. For example, when the two colors are set to magenta and yellow, by obtaining a threshold value for yellow using the following expression, the superposition of dots of magenta and yellow can be minimized.

Threshold value for $Y$=Maximum threshold value in threshold value matrix−Threshold value for $M$ Note that in the above, the response values for making the quantitative comparison of graininess among the mixed color dot pattern and the dot patterns of the respective colors are obtained from the frequency characteristics of the dot patterns, the human visual characteristics (VTF), and the dot power coefficients; however, the response values are not limited to these values. For the visual characteristics, an expression other than the Dooley approximate expression can also be employed, and for a dot power coefficient, not lightness L* but, for example, optical density of a dot printed on a print medium can also be employed. In addition, by employing an evaluation value such as publicly known RMS graininess or a Wiener spectrum, the response values may be set.

In the following, the cases where ink colors used to express a color image are variously combined will be described as other embodiments.

Second Embodiment

As with the first embodiment, the present embodiment also uses an ink system including cyan, magenta, and yellow. However, in this embodiment, for cyan and yellow, a first threshold value matrix is used to perform a color correlating process, and for magenta, a second threshold value matrix is used.

In the present embodiment as well, the block diagram and flowchart illustrated in FIGS. 7A and 7B can be used. In the present embodiment, when processing target data is cyan data In1(x, y), the threshold value acquisition unit 306 selects the first threshold value matrix having blue noise characteristics. The threshold value offset amount calculation unit 308 sets a threshold value offset value to null.

$Ofs\_1(x, y)=0$

When the processing target data is magenta data In2(x, y), the threshold value acquisition unit 306 selects the second threshold value matrix that has blue noise characteristics but is different from the first threshold value matrix. The threshold value offset amount calculation unit 308 sets a threshold value offset value to null.

$Ofs\_2(x, y)=0$

When the processing target data is yellow data In3(x, y), the threshold value acquisition unit 305 selects the first threshold value matrix as in the case of In1(x, y). The threshold value offset amount calculation unit 308 sets a threshold value offset value to In1(x, y).

$Ofs\_3(X, y)=In1(x, y)$

As the first threshold value matrix and the second threshold value matrix, as in the first embodiment, for example, ones illustrated in FIG. 22 can be used.

Figure 13:
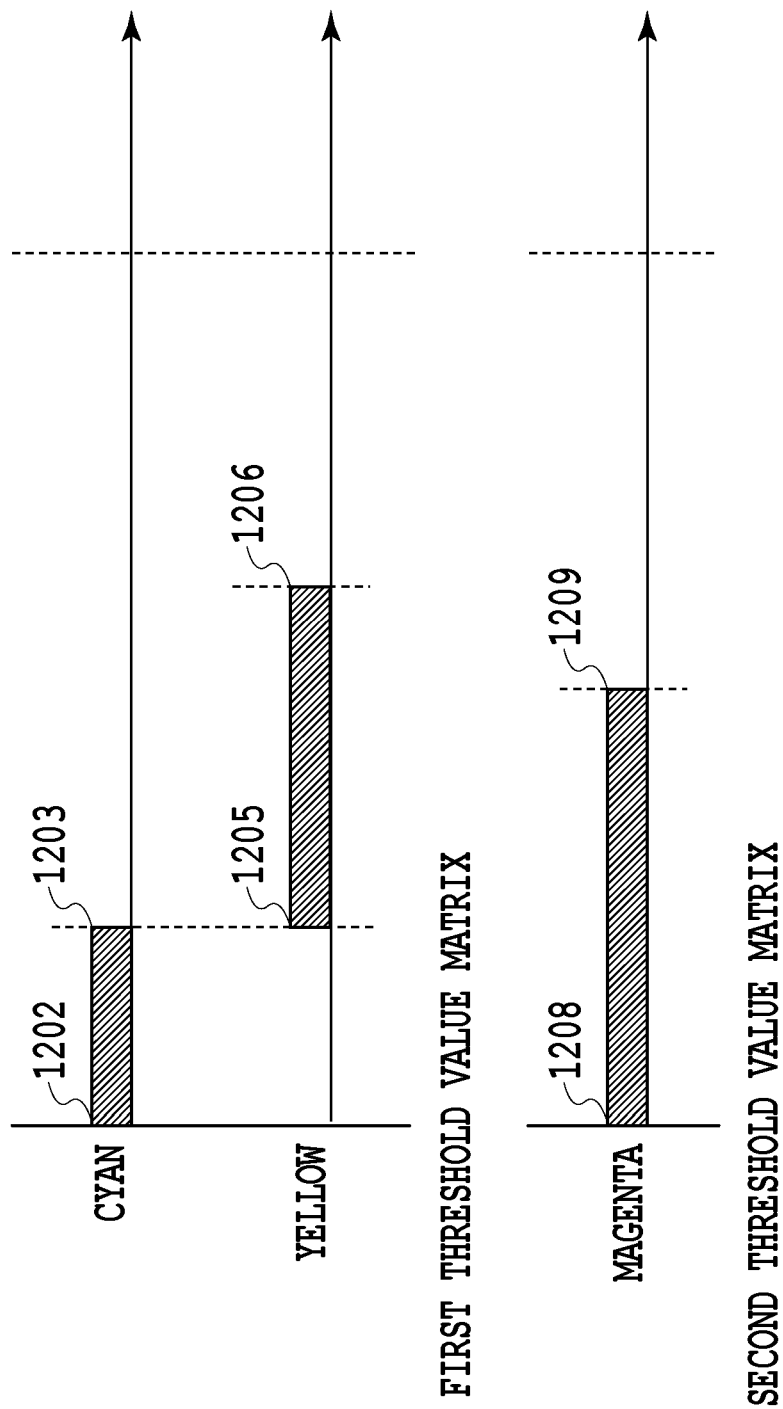
FIG. 13 is a diagram illustrating threshold value ranges determined as printing (1) in a second embodiment.

FIG. 13 is a diagram illustrating threshold value ranges determined as printing (1) in the threshold value matrices set for the respective colors in the present embodiment. In the present embodiment, the threshold value offset value for cyan as the first color is Ofs_1=0. Accordingly, pixel positions corresponding to 0 to In1 (1202 to 1203) among threshold values of 0 to Dth_max in the first threshold value matrix are set to printing (1).

For magenta as the second color as well, the threshold value offset value is Ofs_2=0. Accordingly, pixel positions corresponding to 0 to In2 (1208 to 1209) among threshold values of 0 to Dth_max in the second threshold value matrix are set to printing (1).

The threshold value offset value for yellow as the third color is Ofs_3=In1. Accordingly, pixel positions corresponding to In1 to In1+In3 among the threshold values of 0 to Dth_max in the first threshold value matrix are set to printing (1).

According to the present embodiment as described, dot patterns of cyan and magenta both having relatively strong dot power, and a mixed color dot pattern of cyan and yellow can have blue noise characteristics. Also, as in the first embodiment, while sufficiently suppressing the graininess of a mixed color dot pattern of cyan, magenta, and yellow, the response value of a dot pattern of each of the colors can be kept lower than the response value of the mixed color dot pattern. As a result, the graininess of the whole of an image can be kept lower than before.

Third Embodiment

The present embodiment uses an ink system including black in addition to cyan, magenta, and yellow. The black ink has lower lightness than the other inks, and here the lightness of the black ink is defined as $L^*=10$. For this reason, the dot power of black is the largest among the four inks. In such an ink system, the present embodiment performs a color correlating process using a first threshold value matrix for black and cyan, and performs the color correlating process using a second threshold value matrix for magenta and yellow.

In the present embodiment, in Step S202 of FIG. 5, the image processing apparatus main control unit 108 decomposes pieces of RGB data to pieces of 16-bit gradation data (density data) respectively for C (cyan), M (magenta), Y (yellow), and K (black). Then, in Step S203, a quantization process is performed for each of the four colors.

Figure 14:
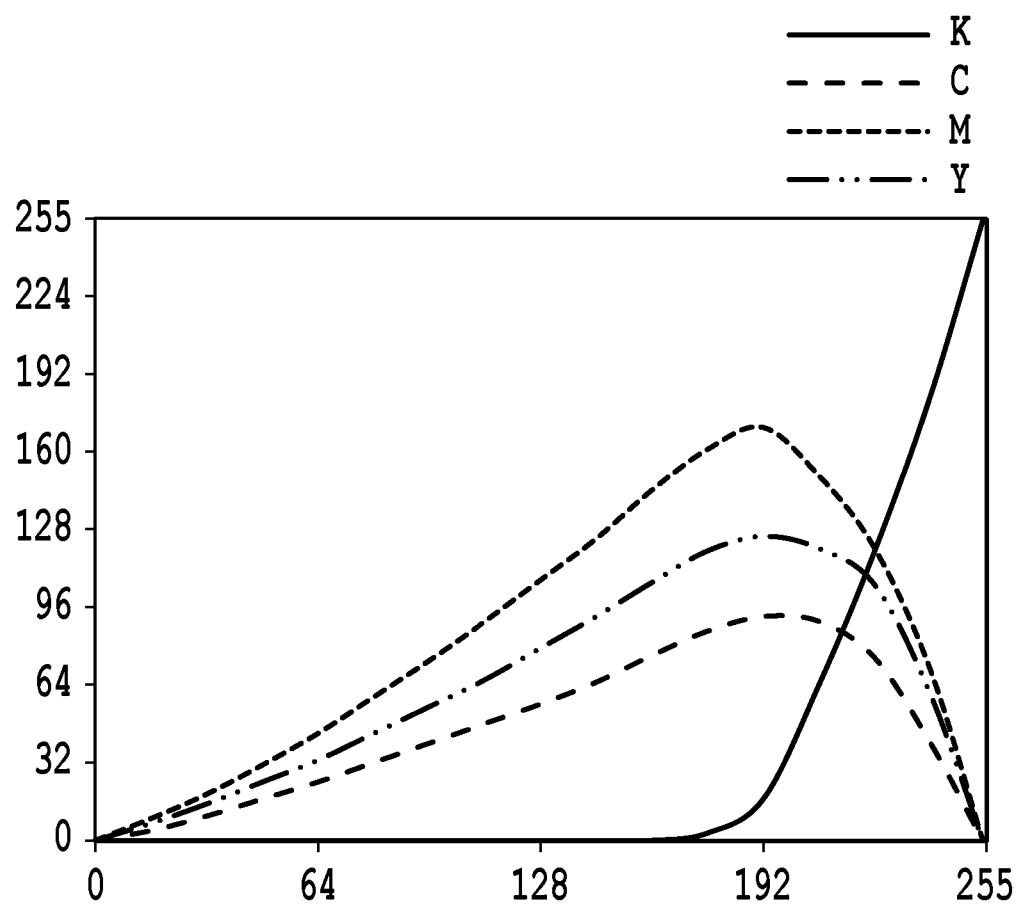
FIG. 14 is a diagram illustrating a gray line conversion state by a color correlating process in a third embodiment.

FIG. 14 illustrates a gray line conversion state in a lookup table referred to by the image processing apparatus main control unit 108 in the color conversion step of Step S202. The horizontal axis represents respective lattice points of gradation from white toward black, and the vertical axis represents an output signal value corresponding to each color, which is here expressed in 256 gradations. An output signal value of each color corresponds to input data In0 to In3 to be inputted to the quantization process unit.

As can be seen from FIG. 14, in a highlight to intermediate density range from white to gray, without using the black ink, a gray image is expressed using only cyan, magenta, and yellow. Black is used in an intermediate to high density range. In the high density range where the black ink is used, since many dots of the other colors have already been printed, the print density of ink dots is sufficiently high, and the graininess of black dots is hardly regarded as a problem. In the present embodiment, in consideration of such a situation, a combination of a threshold value matrix used for each of the inks and a reference color is set as follows.

First, when processing target data is black data In0(x, y), the threshold value acquisition unit 305 selects the first threshold value matrix having blue noise characteristics. The threshold value offset amount calculation unit 308 sets a threshold value offset value to null.

$$Ofs\_0(x, y)=0$$

When the processing target data is cyan data In1(x, y), the threshold value acquisition unit 305 selects the first threshold value matrix as in the case of In0(x, y). The threshold value offset amount calculation unit 308 sets a threshold value offset value to In0(x, y).

$$Ofs\_1(x, y)=In0(x, y)$$

When the processing target data is magenta data In2(x, y), the threshold value acquisition unit 305 selects the second threshold value matrix that has blue noise characteristics but is different from the first threshold value matrix. The threshold value offset amount calculation unit 308 sets a threshold value offset value to null.

$$Ofs\_2(x, y)=0$$

When the processing target data is yellow data In3(x, y), the threshold value acquisition unit 305 selects the second threshold value matrix as in the case of In2(x, y). The threshold value offset amount calculation unit 308 sets a threshold value offset value to In2(x, y)

$$Ofs\_3(X, y)=In2(x, y)$$

Note that in the present embodiment as well, as the first threshold value matrix and the second threshold value matrix, ones illustrated in FIG. 22 can be used.

Figure 15:
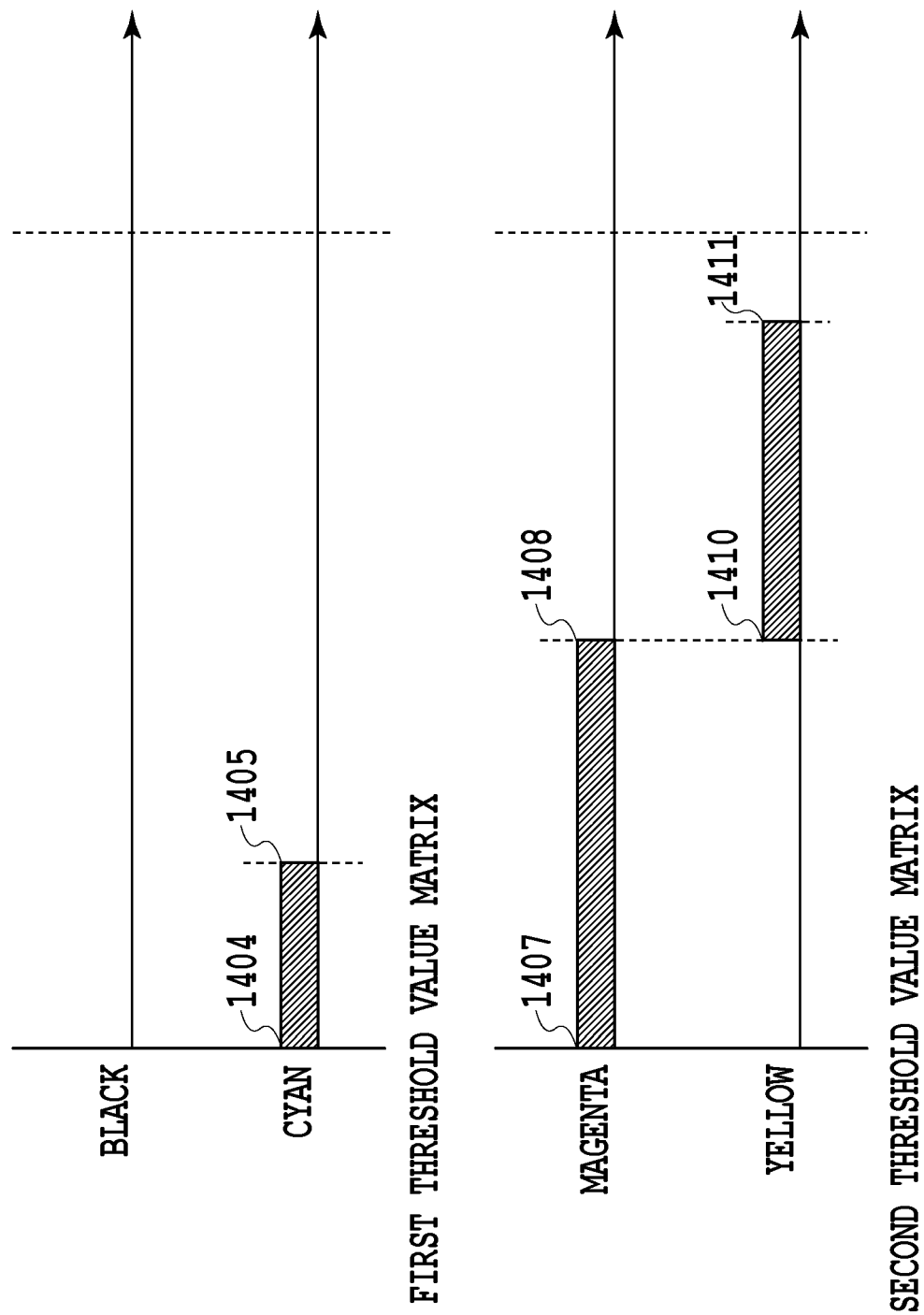
FIG. 15 is a diagram illustrating threshold value ranges determined as printing (1) in the third embodiment.

FIG. 15 is a diagram illustrating threshold value ranges determined as printing in the threshold value matrices set in the present embodiment. The diagram illustrates the case where a signal of gray around intermediate density (128) is inputted. In the case of such density, as described with FIG. 14, the signal value In0(x, y) of the black ink is 0. Accordingly, a threshold value range determined as printing (1) is not present.

In the case of cyan, the threshold value offset value is Ofs_1=In0(x, y). However, as described above, In0(x, y)=0. Accordingly, pixel positions corresponding to 0 to In1 (1404 to 1405) among threshold values of 0 to Dth_max in the first threshold value matrix are set to printing (1).

In the case of magenta, the threshold value offset value is Ofs_2 (x, y)=0. Accordingly, pixel positions corresponding to 0 to In2 (1407 to 1408) among threshold values of 0 to Dth_max in the second threshold value matrix are set to printing (1).

In the case of yellow, the threshold value offset value is Ofs_3(x, y)=In2. Accordingly, In2 to In2+In3 (1410 to 1411) among the threshold values of 0 to Dth_max in the second threshold value matrix is set to printing (1).

According to the present embodiment, in the highlight to intermediate density range where graininess is problematic, no black dot is printed, and therefore as in the first and second embodiments, the same dot pattern as that obtained when treating cyan as the first color in the color correlating process can be actually obtained. That is, a dot pattern of cyan, a dot pattern of magenta, and a mixed color dot pattern of magenta and yellow can obtain blue noise characteristics. As a result, as in the above-described embodiments, while sufficiently suppressing the graininess of the mixed color dot pattern, the response value of a dot pattern of each of the colors can be kept lower than the response value of the mixed color dot pattern, and therefore the graininess of the whole of an image can be suppressed.

Note that in the third embodiment, for cyan and black, the same threshold value matrix is used, and for magenta and yellow, the same threshold value matrix is used; however, as in the relationship between the first embodiment and the second embodiment, cyan and magenta can be replaced by each other. That is, a combination of a threshold value matrix used for each of the colors and a reference color can be set as follows.

When the processing target data is the black data In0(x, y), the threshold value acquisition unit 305 selects the first threshold value matrix having blue noise characteristics. The threshold value offset amount calculation unit 308 sets the threshold value offset value to null.

$$Ofs\_0(x, y)=0$$

When the processing target data is the cyan data In1(x, y), the threshold value acquisition unit 305 selects the second threshold value matrix that has blue noise characteristics but is different from the first threshold value matrix. The threshold value offset amount calculation unit 308 sets the threshold value offset value to null.

$$Ofs\_1(x, y)=0$$

When the processing target data is the magenta data In2(x, y), the threshold value acquisition unit 305 selects the first threshold value matrix as in the case of In0(x, y). The threshold value offset amount calculation unit 308 sets the threshold value offset value to In0(x, y).

$$Ofs\_2(x, y)=In0(x, y)$$

When the processing target data is the yellow data In3(x, y), the threshold value acquisition unit 305 selects the second threshold value matrix as in the case of In1(x, y). The threshold value offset amount calculation unit 308 sets the threshold value offset value to In1(x, y).

$$Ofs\_3(x, y)=In1(x, y)$$

Even when making such settings, in the highlight to intermediate density range, without printing a black dot, the same dot pattern as that obtained when treating magenta as the first color in the color correlating process can be obtained. That is, a dot pattern of cyan, a dot pattern of magenta, and a mixed color dot pattern of cyan and yellow can obtain blue noise characteristics, and therefore the graininess of the whole of an image can be kept lower than before.

Fourth Embodiment

The present embodiment uses an ink system further including gray in addition to cyan, magenta, yellow, and black. The gray ink has higher lightness than the cyan, magenta, and black inks, and here the lightness of the gray ink is defined as L*=70. For this reason, the dot power of gray is the smallest next to that of yellow. In such an ink system, the present embodiment performs a color correlating process using a first threshold value matrix for black, cyan, and gray, and performs the color correlating process using a second threshold value matrix for magenta and yellow.

In the present embodiment, in Step S202 of FIG. 5, the image processing apparatus main control unit 108 decomposes pieces of RGB data to pieces of 16-bit gradation data (density data) respectively for C (cyan), M (magenta), Y (yellow), K (black), and Gray (gray). Then, in Step S203, a quantization process is performed for each of the five colors.

Figure 16:
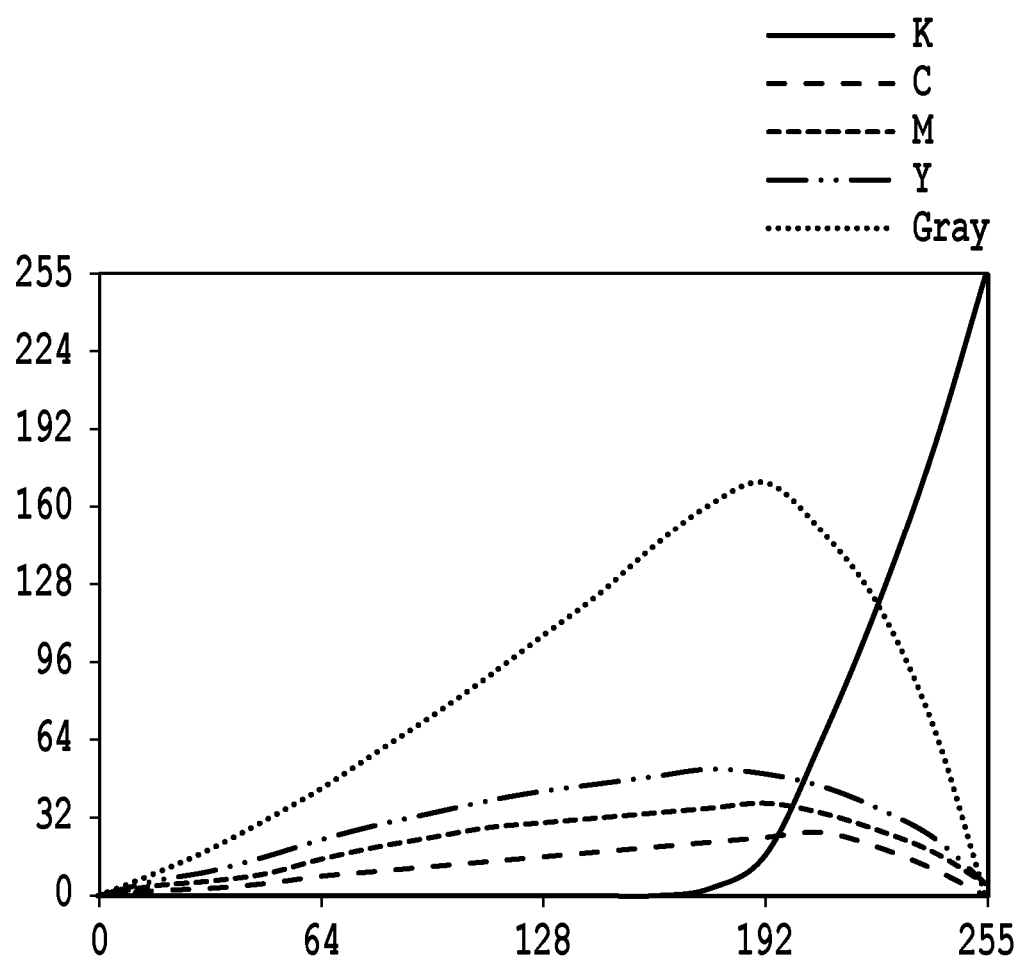
FIG. 16 is a diagram illustrating a gray line conversion state by a color correlating process in a fourth embodiment.

FIG. 16 illustrates a gray line conversion state in a lookup table referred to by the image processing apparatus main control unit 108 in the color conversion step of Step S202.

The horizontal axis represents respective lattice points of gradation from white toward black, and the vertical axis represents an output signal value corresponding to each color, which is here expressed in 256 gradations. As can be seen from FIG. 16, in a highlight to intermediate density gray range, without using the black ink, a gray image is expressed using cyan, magenta, yellow, and a relatively large amount of gray. It turns out that as compared with FIG. 14 that is described in the third embodiment and does not use a gray ink, the signal values of cyan and magenta are low. That is, according to the present embodiment, by introducing the gray ink, the numbers of dots of cyan and magenta having larger dot power than gray are kept small.

On the other hand, as in the third embodiment, black is not used in the highlight to intermediate density range, but used in an intermediate density to high density range. In the high density range where the black ink is used, ink dot print density is sufficiently high, and the graininess of black dots is unlikely to be regarded as a problem. In the present embodiment, in consideration of such a situation, a combination of a threshold value matrix used for each of the inks and a reference color is set as follows.

First, when processing target data is black data In0(x, y), the threshold value acquisition unit 305 selects the first threshold value matrix having blue noise characteristics. The threshold value offset amount calculation unit 308 sets a threshold value offset value to null.

$$Ofs\_0(x, y)=0$$

When the processing target data is cyan data In1(x, y), the threshold value acquisition unit 305 selects the first threshold value matrix as in the case of In0(x, y). The threshold value offset amount calculation unit 308 sets a threshold value offset value to In0(x, y).

$$Ofs\_1(x, y)=In0(x, y)$$

When the processing target data is magenta data In2(x, y), the threshold value acquisition unit 305 selects the second threshold value matrix that has blue noise characteristics but is different from the first threshold value matrix. The threshold value offset amount calculation unit 308 sets a threshold value offset value to null.

$$Ofs\_2(x, y)=0$$

When the processing target data is yellow data In3(x, y), the threshold value acquisition unit 305 selects the second threshold value matrix as in the case of In2(x, y). The threshold value offset amount calculation unit 308 sets a threshold value offset value to In2(x, y)

$$Ofs\_3(X, y)=In2(x, y)$$

When the processing target data is gray data In4(x, y), the threshold value acquisition unit 305 selects the first threshold value matrix as in the cases of In0(x, y) and In1(x, y). The threshold value offset amount calculation unit 308 sets a threshold value offset value to In0(x, y)+In1(x, y).

$$Ofs\_4(x, y)=In0(x, y)+In1(x, y)$$

Note that as in the above-described embodiments, as the first threshold value matrix and the second threshold value matrix, ones illustrated in FIG. 22 can be used.

Figure 17:
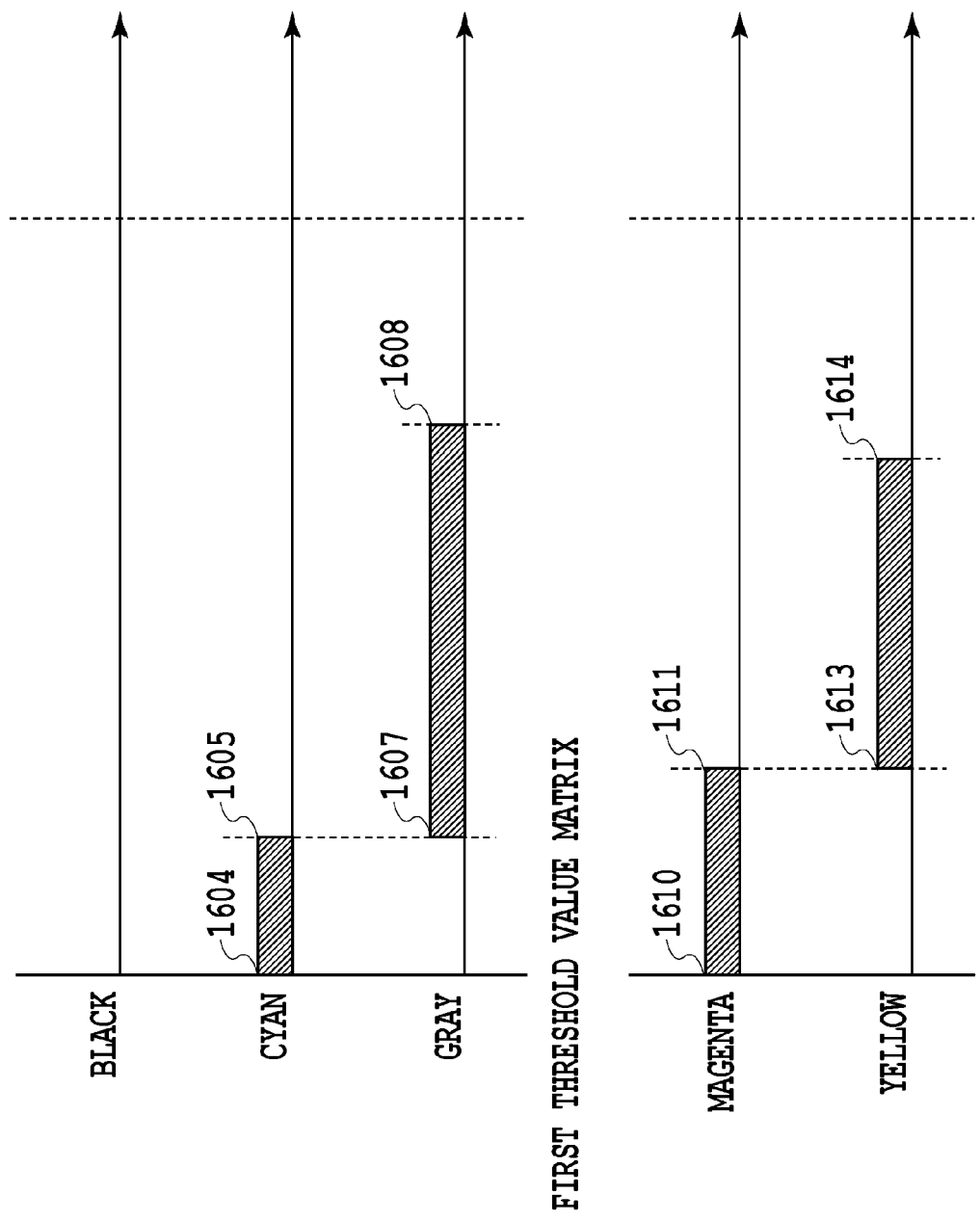
FIG. 17 is a diagram illustrating threshold value ranges determined as printing (1) in the fourth embodiment.
Figures 18A, 18B, 18C:
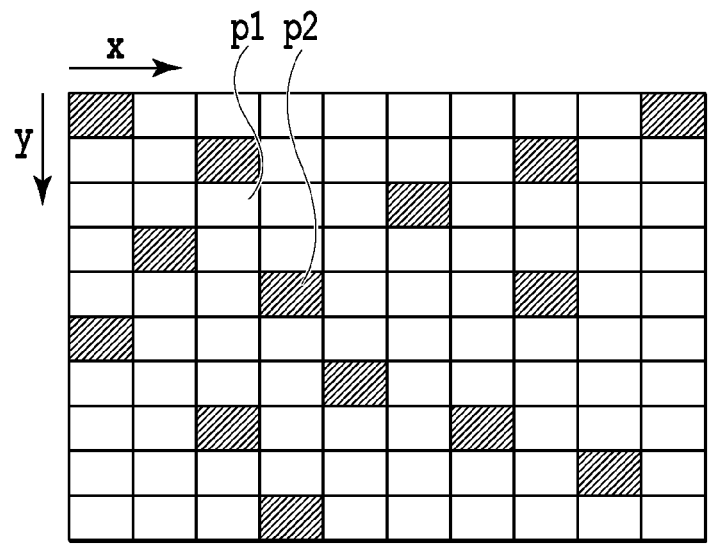
FIGS. 18A to 18C are diagrams for explaining a dither process.
Figure 19A:
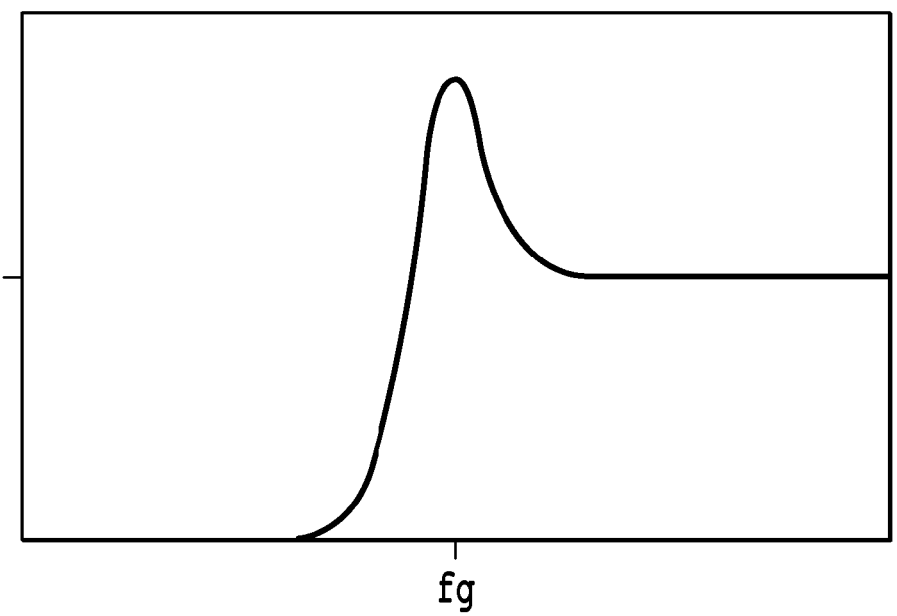
FIGS. 19A and 19B are diagrams illustrating blue noise characteristics and visual characteristics.
Figure 19B:
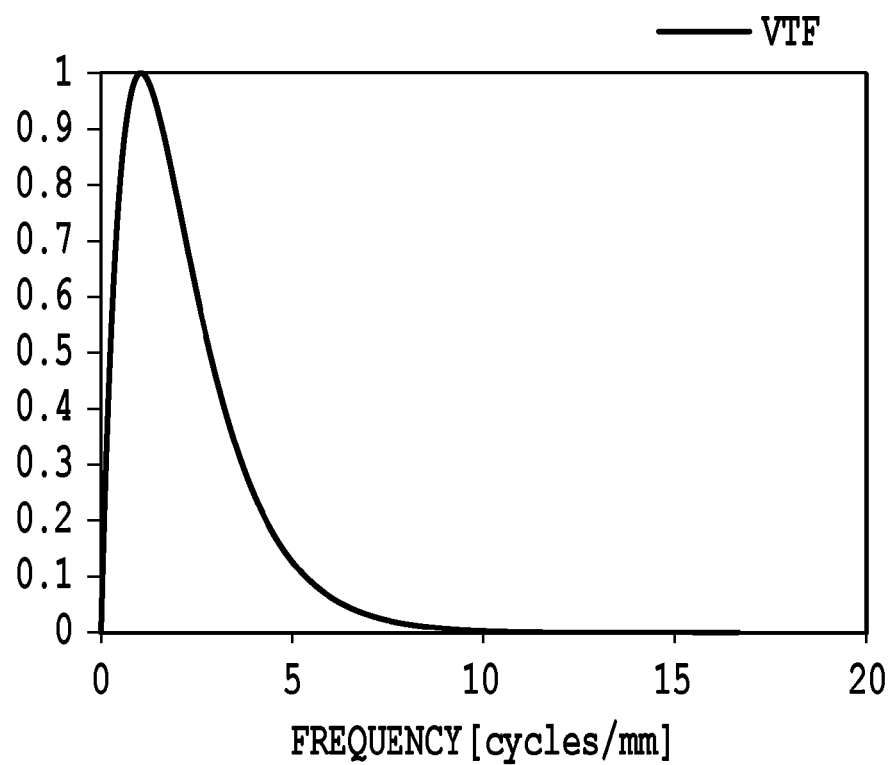
Figure 20:
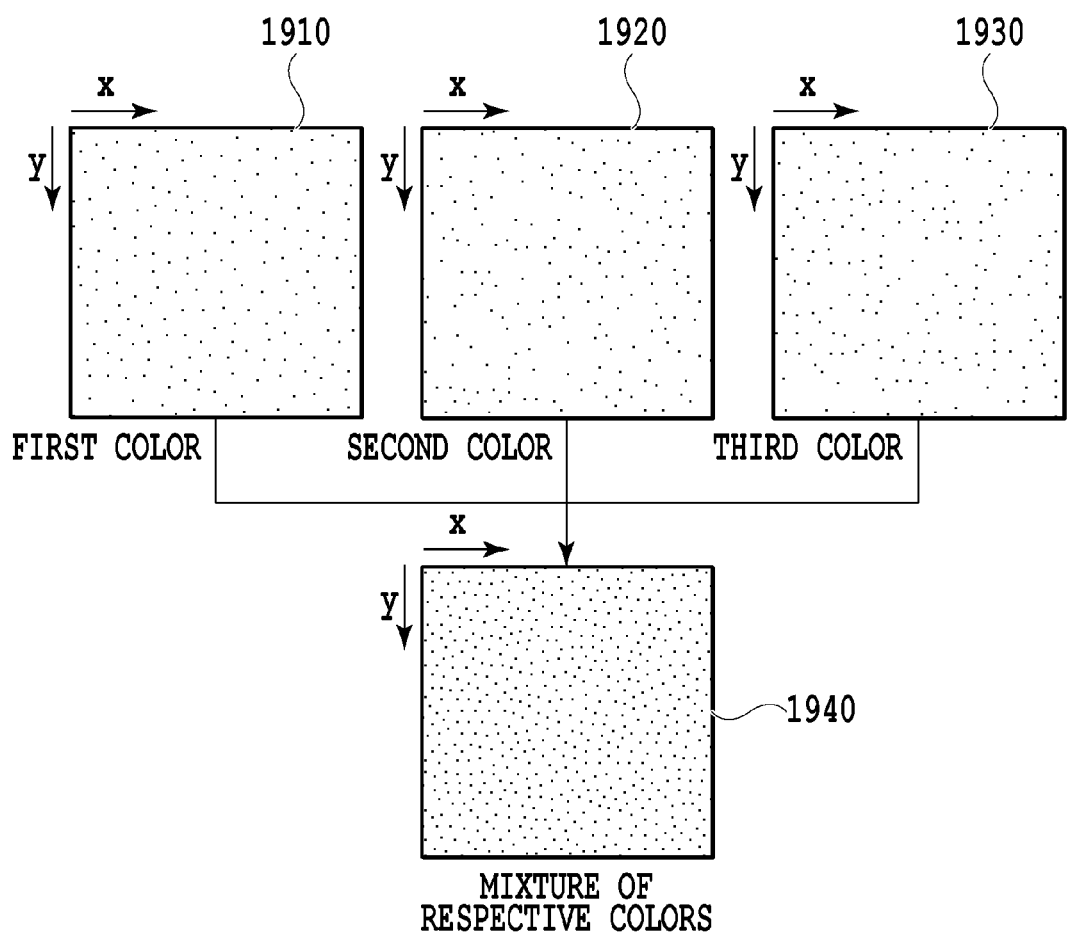
FIG. 20 is a diagram illustrating a dot print state obtained when performing a color correlating process using three colors.
Figure 21A:
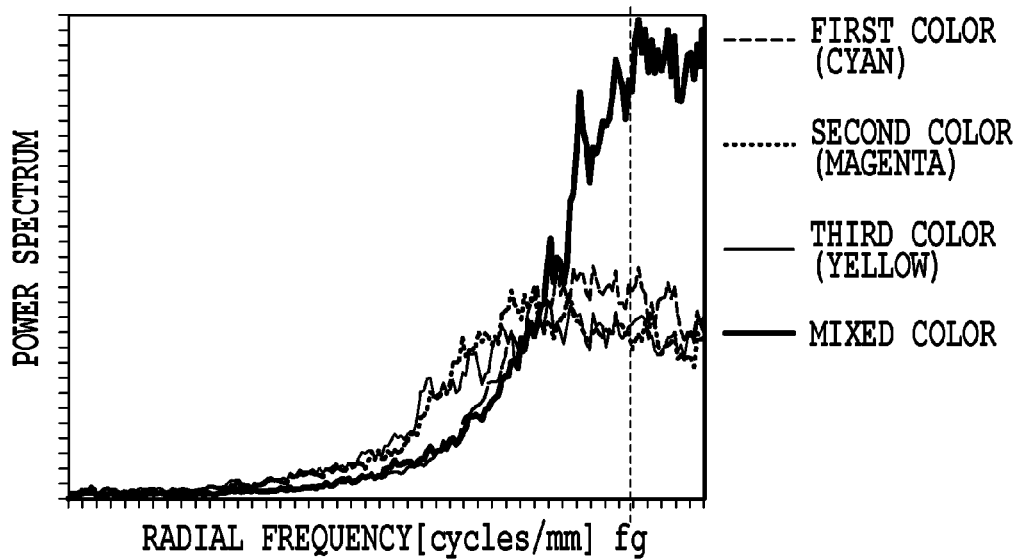
FIGS. 21A to 21C are diagrams quantitatively illustrating the graininesses of dot patterns.
Figure 21B:
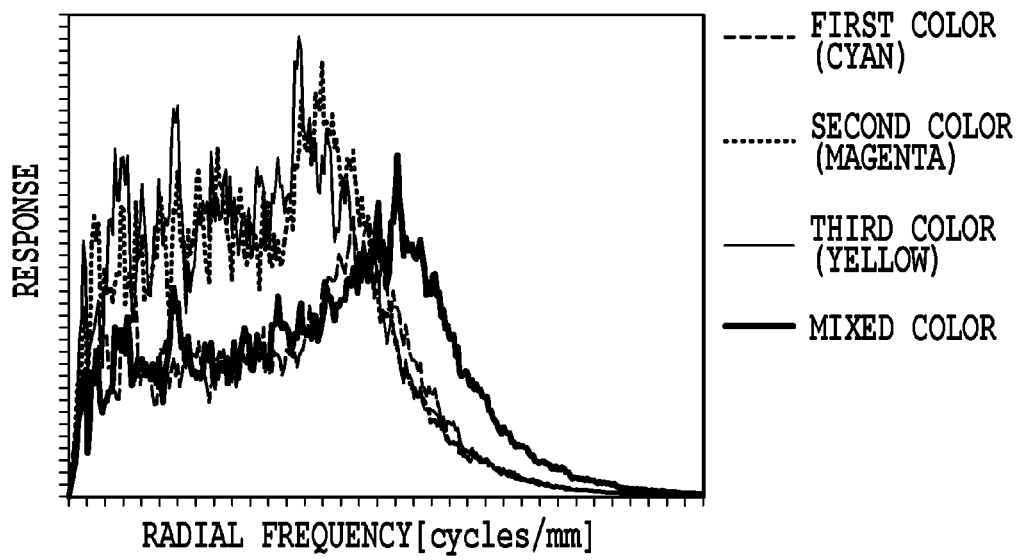
Figure 21C:
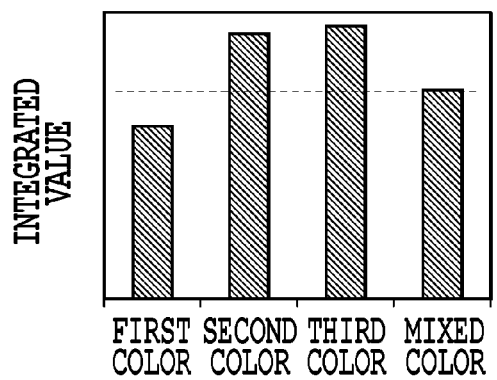

FIG. 17 is a diagram illustrating threshold value ranges determined as printing (1) in the threshold value matrices for the respective colors in the present embodiment. The diagram illustrates the case where a signal of gray around the intermediate density (128) is inputted. In the case of such density, as described with FIG. 16, the signal value In0(x, y) of the black ink is 0. Accordingly, a threshold value range determined as printing (1) is not present.

In the case of cyan, the threshold value offset value is Ofs_1=In0(x, y). However, as described above, In0(x, y)=0.

Accordingly, pixel positions corresponding to 0 to In1 (1604 to 1605) among threshold values of 0 to Dth_max in the first threshold value matrix are set to printing (1).

In the case of gray, the threshold value offset value is Ofs_4(x, y)=In0+In1. Accordingly, In0+In1 to In0+In1+In4, i.e., substantially In1 to In1+In 4 (1607 to 1608) among the threshold values of 0 to Dth_max in the first threshold value matrix is set to printing (1).

In the case of magenta, the threshold value offset value is Ofs_2(x, y)=0. Accordingly, pixel positions corresponding to 0 to In2 (1610 to 1611) among threshold values of 0 to Dth_max in the second threshold value matrix are set to printing (1).

In the case of yellow, the threshold value offset value is Ofs_3(x, y)=In2. Accordingly, In2 to In2+In3 (1613 to 1614) among the threshold values of 0 to Dth_max in the second threshold value matrix is set to printing (1).

According to the present embodiment, in the highlight to intermediate density range where graininess is problematic, no black dot is printed, and therefore as in the first and second embodiments, the same dot pattern as that obtained when treating cyan as the first color in the color correlating process can be actually obtained. That is, a dot pattern of cyan, a dot pattern of magenta, a mixed color dot pattern of cyan and gray, and a mixed color dot pattern of magenta and yellow can obtain blue noise characteristics. On the other hand, neither a dot pattern of yellow nor a dot pattern of gray can obtain blue noise characteristics. However, the dot power of gray or yellow is very small as compared with that of cyan or magenta, and therefore a responsive value and its integrated value as described in the first embodiment are sufficiently low values.

As described, according to the present embodiment, cyan and magenta both having relatively large dot power are substantially collectively set as the first color in the color correlating process, and yellow and gray both having relatively small dot power are set as the second and subsequent colors in the color correlating process. In doing so, as in the above-described embodiments, while sufficiently suppressing the graininesses of the mixed color dot patterns, the response value of a dot pattern of each of the colors can be kept lower than the response values of the mixed color dot patterns, and therefore the graininess of the whole of an image can be suppressed.

Note that the effect of the present embodiment produced by using the gray ink can also be obtained without using the black ink together. In the case of not using the black ink, in the intermediate density to high density range in the graph illustrated in FIG. 16, the signal values of cyan, magenta, and yellow are increased instead of black. In such a form as well, the fact that in the highlight to intermediate density range, the signal value of gray is higher than those of cyan and magenta is the same, and therefore the effect of suppressing graininess can be obtained.

Also, in the fourth embodiment as well, cyan and magenta can be replaced in terms of relationship by each other to set a combination of a threshold value matrix used for each of the inks and a reference color as follows.

When the processing target data is the black data In0(x, y), the threshold value acquisition unit 305 selects the first threshold value matrix having blue noise characteristics. The threshold value offset amount calculation unit 308 sets the threshold value offset value to null.

$$Ofs\_0(x, y)=0$$

When the processing target data is the cyan data In1(x, y), the threshold value acquisition unit 305 selects the second threshold value matrix that has blue noise characteristics but is different from the first threshold value matrix. The threshold value offset amount calculation unit 308 sets the threshold value offset value to null.

$$Ofs\_1(x, y)=0$$

When the processing target data is the magenta data In2(x, y), the threshold value acquisition unit 305 selects the first threshold value matrix as in the case of In0(x, y). The threshold value offset amount calculation unit 308 sets the threshold value offset value to In0(x, y).

$$Ofs\_2(x, y)=In0(x, y)$$

When the processing target data is the yellow data In3(x, y), the threshold value acquisition unit 305 selects the second threshold value matrix as in the case of In1(x, y). The threshold value offset amount calculation unit 308 sets the threshold value offset value to In1(x, y).

$$Ofs\_3(x, y)=In1(x, y)$$

When the processing target data is the gray data In4(x, y), the threshold value acquisition unit 305 selects the first threshold value matrix as in the cases of In0(x, y) and In2(x, y). The threshold value offset amount calculation unit 308 sets the threshold value offset value to In0(x, y)+In2(x, y).

$$Ofs\_4(x, y)=In0(x, y)+In2(x, y)$$

Even when making such settings, in the highlight to intermediate density range, without printing a black dot, the same dot pattern as that obtained when treating cyan and magenta collectively as the first color in the color correlating process and treating yellow and gray as the second and subsequent colors can be obtained. That is, a dot pattern of cyan, a dot pattern of magenta, a mixed color dot pattern of cyan and yellow, and a mixed color dot pattern of magenta and gray can obtain blue noise characteristics, and therefore the graininess of the whole of an image can be kept lower than before.

As described above, according to the present invention, a combination of a threshold value matrix and a reference color in the color correlating process is set so as to substantially use colors having relatively large dot power as the first color in the color correlation process. In doing so, while sufficiently suppressing the graininess of a mixed color dot pattern, the response value of a dot pattern of each color can be kept lower than the response value of the mixed color dot pattern, and therefore the graininess of the whole of an image can be kept lower than before.

Note that in each of the above four embodiments, the case of using some of the cyan, magenta, yellow, black and gray inks is taken as an example to give the description; however, the present invention can also be applied to other systems using various types of inks. For example, as a light color ink having high lightness, instead of the gray ink, a light cyan ink or a light magenta ink can also be used, and a particular color ink such as a red, green, or blue can also be used together. In any case, the above-described effects of the present invention can be obtained as long as multiple threshold value matrices are prepared and a combination of a threshold value matrix and reference data in the color correlating process is set so as to substantially use colors having relatively large dot power as the first color in the color correlating process.

Also, the above description is given on the basis of the configuration where 16-bit data is quantized into several levels by the quantization process, and then binarization is performed by the index expansion process; however, the quantization process performed in Step S203 is not necessarily required to be the multivalued quantization process. That is, the quantization process in Step S203 may directly convert 16-bit gradation data to 1-bit binary data using a dither process. In this case, the index expansion process in Step S204 is omitted, and the binary data obtained in Step S203 is directly outputted to the printing apparatus 1. A bit number of input/output data in another step of FIG. 5 is of course not limited to that in any of the above-described embodiments. In order to keep accuracy, an output bit number may be made larger than an input bit number, and a bit number may be variously adjusted depending on application or situations.

Further, in any of the above-described embodiments, the serial type printing apparatus illustrated in FIG. 2 is used to give the description; however, the present invention can also be applied to a full-line type printing apparatus.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-156850 filed Aug. 7, 2015, which is hereby incorporated by reference wherein in its entirety.

What is claimed is:

1. An image processing apparatus for printing an image on a print medium with use of multiple color materials, the image processing apparatus comprising:
a data acquisition unit configured to acquire pieces of multivalued data of a target pixel, the pieces of multivalued data respectively corresponding to the multiple color materials;
a threshold value acquisition unit configured to, from among multiple threshold value matrices each configured to include arrayed multiple threshold values, set one threshold value matrix for each of the multiple color materials, and from the set threshold value matrix, acquire a first threshold value corresponding to the target pixel;
a reference color setting unit configured to, from among the pieces of multivalued data respectively corresponding to the multiple color materials, set reference data that is referred to in order to perform a predetermined process on the first threshold value acquired by the threshold value acquisition unit for that color material;
a calculation unit configured to, for that color material, perform the predetermined process on the first threshold value on a basis of the reference data set by the reference color setting unit and thereby calculate a second threshold value; and
a generation unit configured to, for that color material, generate quantization data for printing a dot by comparing a corresponding one of the pieces of multivalued data and the second threshold value, wherein
the threshold value acquisition unit and the reference color setting unit set the threshold value matrix and the reference data for that color materials so as to make graininess of a dot pattern of that color material lower than graininess of a mixed color dot pattern obtained by mixing respective dot patterns of the multiple color materials, the dot pattern being determined by the quantization data.

2. The image processing apparatus according to claim 1, wherein
the predetermined process is a process to be performed such that the quantization data generated by the generation unit on a basis of the second threshold value and quantization data based on the reference data set by the reference color setting unit are mutually exclusive.

3. The image processing apparatus according to claim 2, wherein
the predetermined process is a process adapted to offset the first threshold value on a basis of the reference data.

4. The image processing apparatus according to claim 1, wherein:
the threshold value acquisition unit sets mutually different threshold value matrices for multiple color materials having relatively low lightness among the multiple color materials; and
the reference color setting unit sets pieces of reference data to null for the multiple color materials having relatively low lightness.

5. The image processing apparatus according to claim 1, wherein:
the multiple color materials include cyan, magenta, and yellow color materials;
the threshold value acquisition unit sets a first threshold value matrix for the cyan color material, and sets a second threshold value matrix different from the first threshold value matrix for the magenta and yellow color materials; and
the reference color setting unit sets pieces of reference data to null for the cyan and magenta color materials, and for the yellow color material, sets reference data to multivalued data corresponding to the magenta color material.

6. The image processing apparatus according to claim 1, wherein:
the multiple color materials include cyan, magenta, and yellow color materials;
the threshold value acquisition unit sets a first threshold value matrix for the cyan and yellow color materials, and sets a second threshold value matrix different from the first threshold value matrix for the magenta color material; and
the reference color setting unit sets pieces of reference data to null for the cyan and magenta color materials, and for the yellow color material, sets reference data to multivalued data corresponding to the cyan color material.

7. The image processing apparatus according to claim 1, wherein:
the multiple color materials include cyan, magenta, yellow, and black color materials;
the threshold value acquisition unit sets a first threshold value matrix for the black and cyan color materials, and sets a second threshold value matrix different from the first threshold value matrix for the magenta and yellow color materials; and
the reference color setting unit sets pieces of reference data for the black and magenta color materials to null, sets reference data for the cyan color material to multivalued data corresponding to the black color material, and sets reference data for the yellow color material to multivalued data corresponding to the magenta color material.

8. The image processing apparatus according to claim 1, wherein:
the multiple color materials include cyan, magenta, yellow, and black color materials;
the threshold value acquisition unit sets a first threshold value matrix for the black and magenta color materials, and sets a second threshold value matrix different from the first threshold value matrix for the cyan and yellow color materials; and
the reference color setting unit sets pieces of reference data for the black and cyan color materials to null, sets reference data for the magenta color material to multivalued data corresponding to the black color material, and sets reference data for the yellow color material to multivalued data corresponding to the cyan color material.

9. The image processing apparatus according to claim 1, wherein:
the multiple color materials include cyan, magenta, yellow, and light color materials;
the threshold value acquisition unit sets a first threshold value matrix for the cyan and light color materials, and sets a second threshold value matrix different from the first threshold value matrix for the magenta and yellow color materials; and
the reference color setting unit sets reference data for the cyan and magenta color material to null, sets reference data for the light color material to multivalued data corresponding to the cyan color material, and sets reference data for the yellow color material to multivalued data corresponding to the magenta color material.

10. The image processing apparatus according to claim 1, wherein:
the multiple color materials include cyan, magenta, yellow, and light color materials;
the threshold value acquisition unit sets a first threshold value matrix for the magenta and light color materials, and sets a second threshold value matrix different from the first threshold value matrix for the cyan and yellow color materials; and
the reference color setting unit sets reference data for the cyan and magenta color material to null, sets reference data for the light color material to multivalued data corresponding to the magenta color material, and sets reference data for the yellow color material to multivalued data corresponding to the cyan color material.

11. The image processing apparatus according to claim 1, wherein:
the multiple color materials include cyan, magenta, yellow, black, and light color materials;
the threshold value acquisition unit sets a first threshold value matrix for the black, cyan, and light color materials, and sets a second threshold value matrix different from the first threshold value matrix for the magenta and yellow color materials; and
the reference color setting unit sets pieces of reference data for the black and magenta color materials to null, sets reference data for the cyan color material to multivalued data corresponding to the black color material, sets reference data for the light color material to pieces of multivalued data corresponding to the black and cyan color materials, and sets reference data for the yellow color material to multivalued data corresponding to the magenta color material.

12. The image processing apparatus according to claim 1, wherein:
the multiple color materials include cyan, magenta, yellow, black, and light color materials;
the threshold value acquisition unit sets a first threshold value matrix for the black, magenta, and light color materials, and sets a second threshold value matrix different from the first threshold value matrix for the cyan and yellow color materials; and
the reference color setting unit sets pieces of reference data for the black and cyan color materials to null, sets reference data for the magenta color material to multivalued data corresponding to the black color material, sets reference data for the light color material to pieces of multivalued data corresponding to the black and magenta color materials, and sets reference data for the yellow color material to multivalued data corresponding to the cyan color material.

13. The image processing apparatus according to claim 1, wherein
the threshold value matrices have a blue noise characteristic.

14. The image processing apparatus according to claim 1, further comprising
a unit configured to print that color material on the print medium in accordance with the quantization data. generates the second quantization data on a basis of the second multivalued data acquired by the acquisition unit and the second threshold value matrix, and (iii) generates the third quantization data on a basis of the second and third pieces of multivalued data acquired by the acquisition unit and the second threshold value matrix.

15. An image processing method for printing an image on a print medium with use of multiple color materials, the image processing method comprising:
a data acquisition step of acquiring pieces of multivalued data of a target pixel, the pieces of multivalued data respectively corresponding to the multiple color materials;
a threshold value acquisition step of, from among multiple threshold value matrices each configured to include arrayed multiple threshold values, setting one threshold value matrix for each of the multiple color materials, and from the set threshold value matrix, acquiring a first threshold value corresponding to the target pixel;
a reference color setting step of, from among the pieces of multivalued data respectively corresponding to the multiple color materials, setting reference data that is referred to in order to perform a predetermined process on the first threshold value acquired by the threshold value acquisition step for that color material;
a calculation step of, for that color material, performing the predetermined process on the first threshold value on a basis of the reference data set by the reference color setting step and thereby calculating a second threshold value; and a generation step of, for that color material, generating quantization data for printing a dot by comparing a corresponding one of the pieces of multivalued data and the second threshold value, wherein the threshold value acquisition step and the reference color setting step set the threshold value matrix and the reference data for that color material so as to make graininess of a dot pattern of that color material lower than graininess of a mixed color dot pattern obtained by mixing respective dot patterns of the multiple color materials, the dot pattern being determined by the quantization data.

* * * * *